(12) United States Patent
Bosworth

(10) Patent No.: US 11,039,651 B1
(45) Date of Patent: Jun. 22, 2021

(54) ARTIFICIAL REALITY HAT

(71) Applicant: Facebook Technologies, LLC, Menlo Park, CA (US)

(72) Inventor: Andrew Garrod Bosworth, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/445,315

(22) Filed: Jun. 19, 2019

(51) Int. Cl.
G06F 3/01 (2006.01)
A42B 1/245 (2021.01)
H04R 1/46 (2006.01)

(52) U.S. Cl.
CPC .............. *A42B 1/245* (2013.01); *G06F 3/011* (2013.01); *G06F 3/012* (2013.01); *G06F 3/013* (2013.01); *G06F 3/015* (2013.01); *G06F 3/016* (2013.01); *H04R 1/46* (2013.01); *H04R 2400/03* (2013.01)

(58) Field of Classification Search
CPC ...................................................... G06F 3/011
USPC .......................................................... 345/156
See application file for complete search history.

(56) References Cited

U.S. PATENT DOCUMENTS

| | | | | |
|---|---|---|---|---|
| 2004/0008157 | A1* | 1/2004 | Brubaker | G02B 27/017 345/8 |
| 2010/0313335 | A1* | 12/2010 | Waters | H04N 5/2254 2/209.13 |
| 2012/0050144 | A1* | 3/2012 | Morlock | G06F 3/012 345/8 |
| 2018/0088340 | A1* | 3/2018 | Amayeh | G06K 9/00275 |
| 2019/0320978 | A1* | 10/2019 | Lee | A42B 3/0433 |
| 2020/0033601 | A1* | 1/2020 | Magrath | G06F 3/011 |
| 2020/0174558 | A1* | 6/2020 | Gui | G06F 3/012 |
| 2020/0209509 | A1* | 7/2020 | Chen | G02B 7/023 |

\* cited by examiner

*Primary Examiner* — Long D Pham
(74) *Attorney, Agent, or Firm* — FisherBroyles, LLP

(57) ABSTRACT

The disclosed artificial reality hat may include a crown portion dimensioned to at least partially cover a head of a user, a brim portion that extends from the crown portion in at least a forward direction away from the crown portion, and a display subsystem, coupled to the brim portion, that is configured to present computer-generated images. Various other systems and methods are also disclosed.

20 Claims, 15 Drawing Sheets

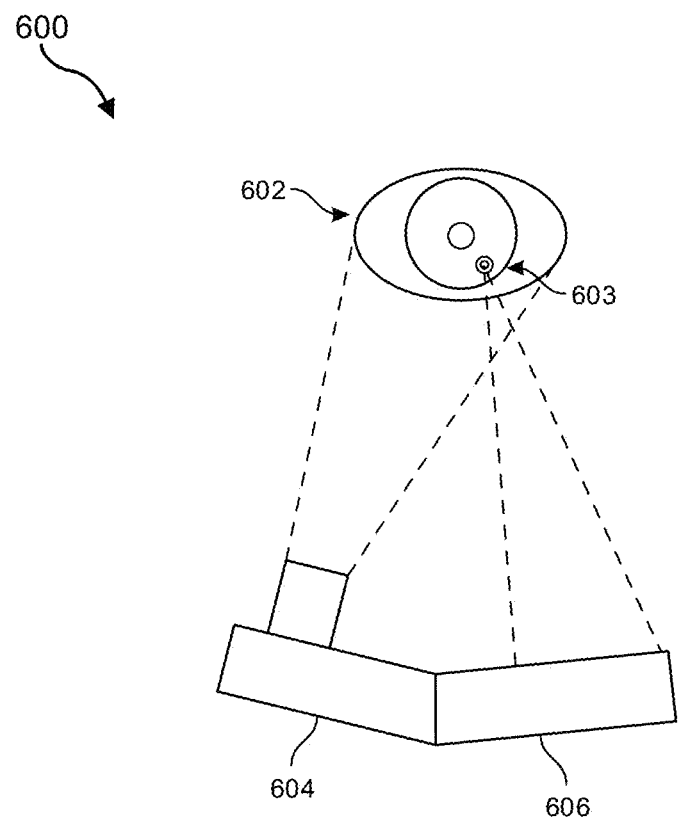
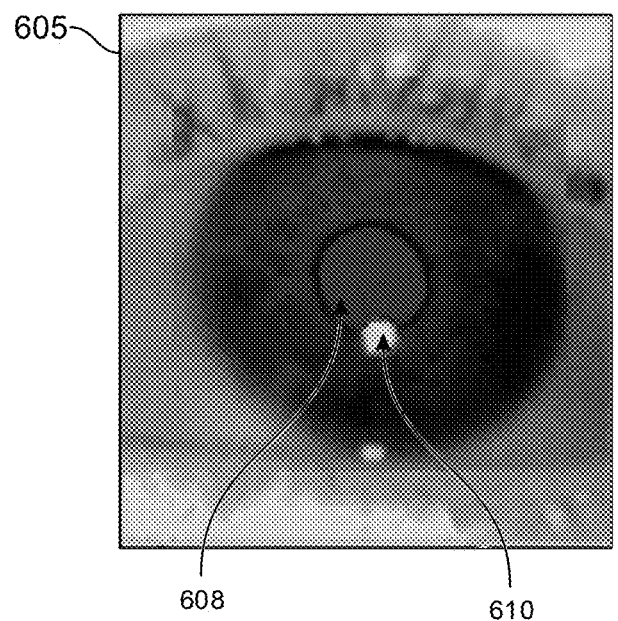
FIG. 6

ARTIFICIAL REALITY HAT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 6 is an illustration of an exemplary eye-tracking subsystem that can be incorporated into an artificial reality hat.

Figure 1:
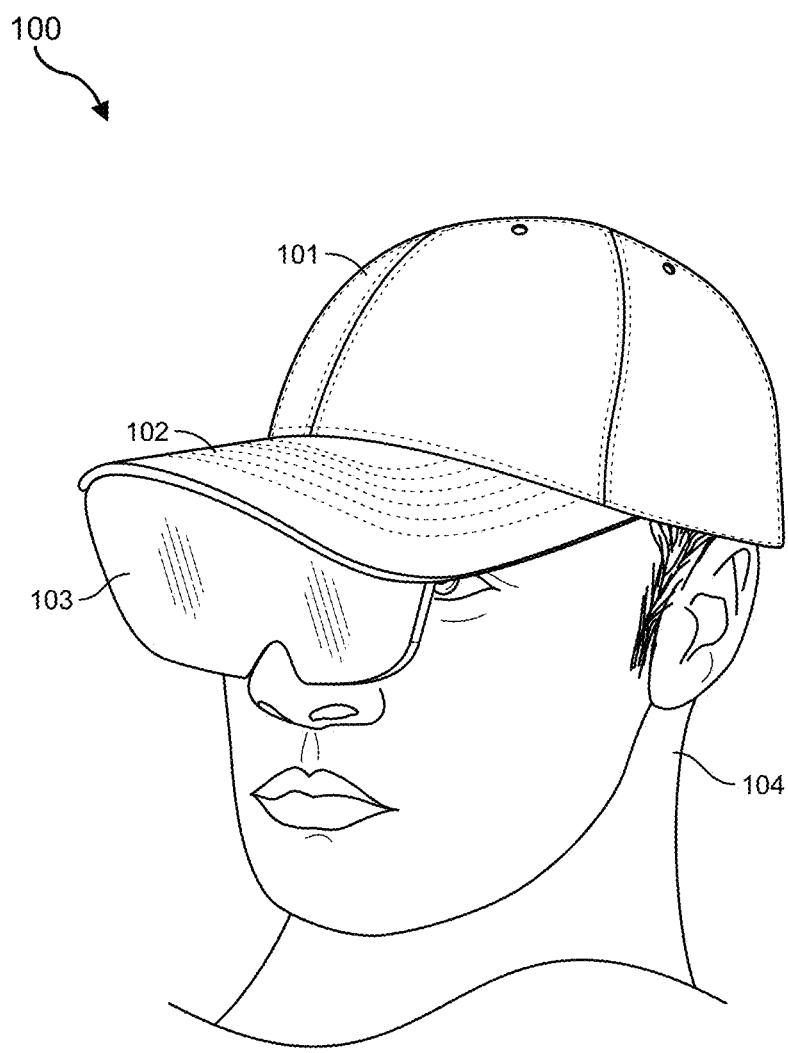
FIG. 1 is a perspective view of an exemplary artificial reality hat.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to an artificial reality hat or other type of headwear. Manufacturers of artificial-reality systems have traditionally focused on various eyewear-based form factors, such as glasses and goggles. Conventional artificial reality glasses and goggles, however, are sometimes thick, heavy, and unbalanced and/or may generate excessive heat that is uncomfortable against a user's skin. In addition, because these glasses or goggles are designed to be worn on the bridge of a user's nose, it is often difficult to incorporate advanced computing components, such as complex processors, eye-tracking systems, and the like, into the same without negatively impacting the comfort level of the end user.

The present disclosure, in contrast, describes a variety of approaches to incorporating artificial reality components into different hat-based form factors, such as baseball caps, visors, cowboy hats, fedoras, etc. As will be described in greater detail below, the hat-based form factors described herein may, due to their size and shape, provide more surface area for (and an improved ability to evenly distribute the weight of) artificial reality components, potentially resulting in a more complete or advanced system. In addition, since only a portion of these hats (when worn) is in physical contact with a user's head, processors and other heat-generating components may be disposed in sections of the hat (such as the hat's brim and/or portions of the crown) that are away from the user's body, potentially resulting in improved heat dissipation and user comfort. Moreover, because the brim and other portions of hats often extend out and away from a user's head, the hat-based form factors described herein may incorporate components and subsystems that are less practical or feasible in eyewear-based form factors, such as face-tracking cameras, body-tracking cameras, and/or in-field eye-tracking cameras.

The following detailed descriptions will provide, with reference to FIGS. 1-11, different embodiments and types of artificial reality hats. The disclosure corresponding to FIG. 12 describes an exemplary method of manufacturing an artificial reality hat, while the disclosure corresponding to FIGS. 13-16 describes various haptic systems and environments in which an artificial reality hat may be used. Features from any of the embodiments described herein may be used in combination with one another in accordance with the general principles described herein. These and other embodiments, features, and advantages will be more fully understood upon reading the following detailed description in conjunction with the accompanying drawings and claims.

The artificial reality hats described herein may include or be implemented in conjunction with various types of artificial-reality systems. In general, artificial reality is a form of reality that has been adjusted in some manner before presentation to a user, which may include, for example, a virtual reality, an augmented reality, a mixed reality, a hybrid reality, or some combination and/or derivative thereof. Artificial-reality content provided by an artificial reality hat may include completely computer-generated content or computer-generated content combined with captured/viewed (e.g., real-world) content. Such artificial-reality content may include video, image, audio, haptic feedback, or some combination thereof, any of which may be presented in a single channel or in multiple channels (such as stereo video that produces a three-dimensional (3D) effect to the viewer). Additionally, in some embodiments, artificial reality hats may include, be incorporated in, or otherwise associated with applications, products, accessories, services, or some combination thereof, that are used to, for example, create content in an artificial reality and/or enable interactions in an artificial reality.

As discussed in greater detail below, the artificial reality hats described herein may be implemented in a variety of different form factors and configurations. For example, an artificial reality hat may include a near-eye display (NED) that also provides visibility into the real world (typically referred to as an augmented reality display) or that visually immerses a user in an artificial reality (typically referred to as a virtual reality display). While some artificial reality hats may be self-contained systems, other artificial reality hats may communicate and/or coordinate with external devices to provide an artificial-reality experience to a user. Examples of such external devices include handheld controllers, mobile devices, desktop computers, devices worn by a user (e.g., the vibrotactile system 1300 in FIG. 13, the haptic device 1404 in FIG. 14, and/or the haptic device 1530 in FIG. 15), devices worn by one or more other users, and/or any other suitable external system.

FIG. 1 is a perspective view of an exemplary artificial reality hat 100. As shown in this figure, the artificial reality hat 100 may include a crown portion 101 dimensioned to at least partially cover a head of a user 104. In this example, the artificial reality hat 100 may also include a brim portion 102 that extends out and away from the crown portion 101.

The artificial reality hat 100 (including the crown portion 101 and the brim portion 102) may be of substantially any size or shape. In one example (such as the example illustrated in FIG. 1), the brim portion 102 (or simply "brim") may extend out and away from, and only partially cover, the user's face. In other examples (such as the example illustrated in FIG. 11), the brim portion 102 may extend out and away from, and fully surround, the user's head. Similarly, the crown portion 101 (or simply "crown") may, depending on the form factor in question, fully or only partially surround or cover a user's head.

The artificial reality hat 100 may be formed as a single, integrated article or as separate, discrete elements that are later joined together (via, e.g., sewing, gluing, etc.). Each of these elements may likewise encompass one or more discrete parts. For example, the crown portion 101 may include an inner band (such as inner band 807 in FIG. 8) and potentially an outer band (such as outer band 1101 in FIG. 11).

As will be described in greater detail below, the artificial reality hat 100 may include, house, or otherwise incorporate one or more artificial reality components, such as a display subsystem 103. This display subsystem 103 may be integrated within or otherwise coupled to the artificial reality hat 100 in a variety of ways. In one example, as shown in FIG. 1, the display subsystem 103 may be attached (either fixedly or removably) to the brim portion 102 of the artificial reality hat 100. In this example, the display subsystem 103 may be configured so that, when the artificial reality hat 100 is worn by a user, a display device of the display subsystem 103 is positioned in front of the user's eyes. In some embodiments, as shown in FIG. 1, the display 103 may include a notch in the bottom middle portion to accommodate a user's nose. In other embodiments (as shown, for example, in FIG. 10), the display may not include a notch for the user's nose.

The display subsystem 103 may include a variety of hardware and/or software components designed to generate and/or present computer-generated images. In some embodiments, the display subsystem 103 may include a transparent or semi-transparent display that also provides visibility into the real world, effectively blending computer-generated artificial reality elements with actual reality. In another embodiment, the display subsystem 103 may include an opaque display that mostly or completely covers a user's field of view, effectively replacing one or more of the user's sensory perceptions of the real world with a virtual experience.

The display subsystem 103 may include display devices of a variety of different shapes and forms, such as one or more liquid crystal displays (LCDs), light emitting diode (LED) displays, organic LED (OLED) displays, digital light projection (DLP) micro-displays, liquid crystal on silicon (LCoS) micro-displays, retinal scanning systems, laser-based displays, and/or any other suitable type of display. The display subsystem 103 may include a single display screen for both eyes or may include a separate display screen for each eye, which may allow for additional flexibility for varifocal adjustments or for correcting a user's refractive error.

In addition to or instead of using display screens, the display subsystem 103 may include one or more projection systems. For example, the display subsystem 103 may include one or more micro-LED projectors that project light (using, e.g., a waveguide) into a display device, such as a clear combiner lens that allows ambient light to pass through. The display device may refract the projected light toward a user's pupil and may enable a user to simultaneously view both artificial-reality content and the real world. The display subsystem 103 may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc.

Transparent displays for artificial reality hats may be configured in a variety of ways using any suitable combination of projectors and waveguides. For example, the display subsystem 103 may include a projector device that has a first monochromatic emitter array having a plurality of emitters of a first color disposed in a two-dimensional configuration and a second monochromatic emitter array having a plurality of emitters of a second, different color disposed in a corresponding two-dimensional configuration. These two-dimensional configurations may be identical in some embodiments. The first and second monochromatic emitter arrays may be configured to emit images of the first and second colors toward a coupling area included in a waveguide configuration having one or more waveguide members. The waveguide configuration may combine the images to produce at least one polychromatic image directed toward an eyebox. In some examples, the waveguide configuration may be configured to project multiple replications of the polychromatic image toward the eyebox.

In some embodiments, at least one monochromatic emitter array may be coupled to a waveguide/combiner. The emitter array, in some embodiments, may be a vertical-cavity surface-emitting laser (VCSEL) array or a microLED array having a high fill factor (e.g., by way of physical or optical means, such as via microlens or other refractory structures, or reflective structures), which may be close to 100%. In other embodiments, the emitter array can include other devices (e.g., direct emission light sources), including, but not limited to, semiconductor diodes, semiconductor laser diodes, an OLED pixel array, a quantum dot array, an LCD with a variable backlight source, and the like. In these embodiments, light may first pass through a small air gap between the emitter array and the waveguide before interacting with a coupling element, incorporated into the waveguide, that directs the light along a total internal reflection path. The path, in some examples, can include grating structures or other types of light decoupling structures that decouple portions of the light from the total internal reflection path to direct multiple instances of an image (or "pupil replications") out of the waveguide at different places around the brim of an artificial reality hat and toward an eyebox.

In the above embodiments, artificial reality hats may include red, green, and blue monochromatic emitter arrays that can reproduce full-color images when the respective red, green, and blue monochromatic images are combined by the waveguide. The emitter arrays may be coupled to the waveguide by three coupling elements, with one coupling element specially adapted for each wavelength, to produce full-color images when combined. The colors can be combined in a single waveguide or in separate waveguides designed for specific wavelengths, which may prevent crosstalk and allow for per-color optimization of each of the waveguides and associated gratings that provide for internal reflection and decoupling. Because the emitter arrays may each be coupled to the waveguide at different positions, the area of full-color replication may be limited to the overlap of all three colors. In this example, the area of full-color replication may be larger than the eyebox.

In some embodiments, to help resolve a vergence-accommodation conflict (VAC) that may be experienced by an artificial reality hat user, multiple waveguide/projector display subsystems may be positioned in series to present full-color images at different focus distances to the eye of the user. The display subsystems may be separated by an optical element, such as a lens, to provide for the different focus distances between each of the two displays. To optimize the difference in focus distances for a particular application or situation, the individual display subsystem stacks may be separated by a variable-focus lens, such as a common liquid or a liquid crystal lens that can be tuned in situ to achieve a desired difference in focus distance between the display subsystems.

In some artificial reality hat configurations, an increased field of view may be achieved using multiple sets of emitter arrays coupled into a single waveguide configuration. For example, one display device having multiple sets of emitter arrays may be coupled to a left portion of a brim and may emit light toward a user's left eye, while another display device having multiple sets of emitter arrays may be coupled to a right portion of the brim and may emit light toward the user's right eye. The sets of emitter arrays for each display device may be coupled to the brim exactly 180 degrees apart from each other or may be coupled to the brim at any other angle relative to each other, in some embodiments, and at different angles with respect to each other in other embodiments. The sets of emitter arrays for each display device may be driven by separate drivers or controllers or may be driven by a single driver.

Figure 9:
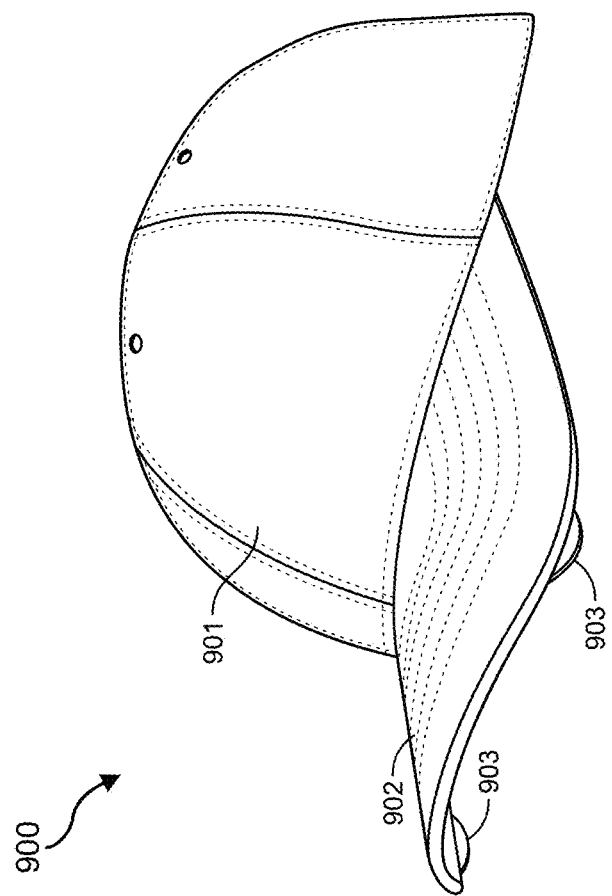
FIG. 9 is a perspective view of an exemplary artificial reality hat that includes one or more retinal projectors.

In addition to or instead of being configured with a waveguide-based retina scanning system, the display subsystem 103 may be configured with any other suitable type or form of retina scanning system, such as the retinal projectors used in virtual retina displays (as described in greater detail below in connection with FIG. 9).

In some examples, the display subsystem 103 may also include an optical subsystem having one or more lenses (e.g., conventional concave or convex lenses, Fresnel lenses, adjustable liquid lenses, etc.) through which a user may view a display screen. This optical subsystem may serve a variety of purposes, including to collimate light (to, e.g., make an object appear at a greater distance than its physical distance), to magnify light (to, e.g., make an object appear larger than its actual size), and/or to relay light (to, e.g., the viewer's eyes). Such an optical subsystem may be used in a non-pupil-forming architecture (such as a single lens configuration that directly collimates light but results in so-called pincushion distortion) and/or a pupil-forming architecture (such as a multi-lens configuration that produces so-called barrel distortion designed to nullify pincushion distortion).

The artificial reality hats disclosed herein may incorporate a variety of elements that may enhance or improve the effectiveness of display subsystem 103. In one example, an artificial reality hat may also include a shroud or other portion of material that blocks the user's peripheral view of their environment while allowing the user to see content provided via the display subsystem 103. In this example, the shroud may help to immerse the user in an artificial reality environment by, for example, blocking the user's view of their local environment and/or by preventing stray light from hitting a display device of the display subsystem 103. The shroud may be made of any of a variety of materials, such as plastic, fabric, metal, wood, composite material, or substantially any other type of substance that is capable of holding a form or capable of being sewn into place. The shroud may be integrated with the display subsystem 103, removably attachable to the display subsystem 103, and/or otherwise capable of being stored with or removed from the display subsystem 103.

Figure 2A:
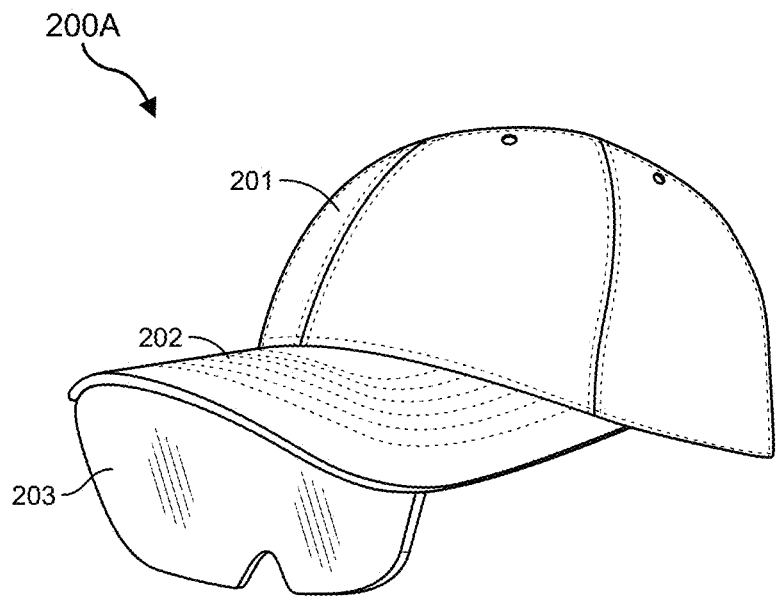
FIG. 2A is a perspective view of an exemplary artificial reality hat in a viewing position.

The artificial reality hats described herein may incorporate display subsystems in a variety of different ways using any number of form factors. FIG. 2A is an illustration of an exemplary artificial reality hat 200A with a crown portion 201 and a brim portion 202. In this example, the artificial reality hat 200A may also include a display subsystem that includes a display 203, which may include or represent any of the display components and/or elements detailed above. In one example, the display 203 may be configured to present computer-generated images to the user (such as user 104 in FIG. 1).

Figure 2B:
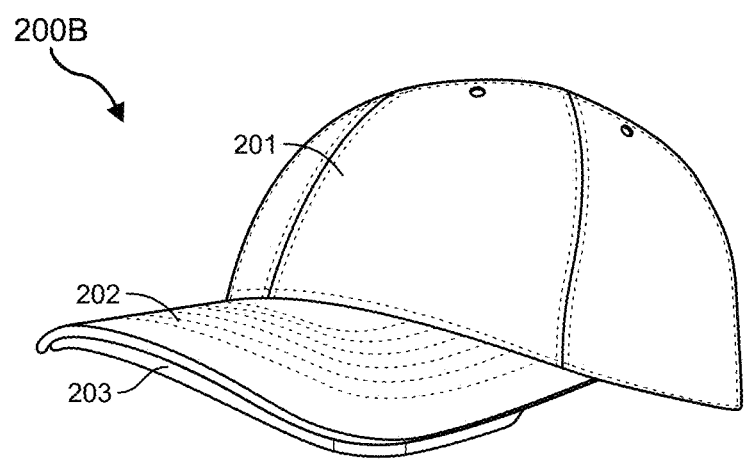
FIG. 2B is a perspective view of the artificial reality hat from FIG. 2A in a storage position.

The display 203 in FIGS. 2A and 2B may be integrated within and/or coupled to the artificial reality hat 200A/200B in a variety of different ways. In one example, the display 203 may be coupled to the brim 202 portion via hinges or via some other attachment or positioning mechanism. In this example, the display 203 may fold down into a viewing position that, when artificial reality hat 200A is worn by a user, is substantially in front of the user's eyes. In other cases, for example, the display 203 may be coupled to the brim via a sliding mechanism with tracks on lateral sides of the display 203. In this case, the display 203 may slide along the tracks up and into a cavity defined in the crown portion 201 of the artificial reality hat 200A, effectively removing the display 203 from the user's field of view.

When the display 203 is placed in its viewing position, as generally shown in FIG. 2A, a user (e.g., such as user 104 in FIG. 1) may be able to view the display 203 and any computer-generated images that are presented thereon. When the user 104 wants to close or store the display, the user 104 may simply pivot or slide the display 203 upwards into its closed position. For example, as shown in FIG. 2B, the display 203 of the artificial reality hat 200B may be folded, slid, or otherwise moved to a closed or storage position. The display 203 may be secured in this closed position via a latch, a pin, or other mechanical or electromechanical means of holding the display in place. In this closed position, the display 203 may be hidden or tucked away, out of the user's field of view.

Accordingly, the display 203 may be adjustably moveable between at least a viewing position in which the display is visible and substantially in the user's field of view and a closed position in which the display is not (easily) visible and is substantially out of the user's field of view (and/or any position in-between). In some cases, the artificial reality hat 200A/200B may include an actuator (e.g., a button or voice-activated subsystem) that, when triggered, causes servo motors or other mechanical or electromechanical means to automatically raise or lower the display 203 between its storage and viewing positions. In other examples, the user may manually move the display 203 between its various positions.

Figure 3:
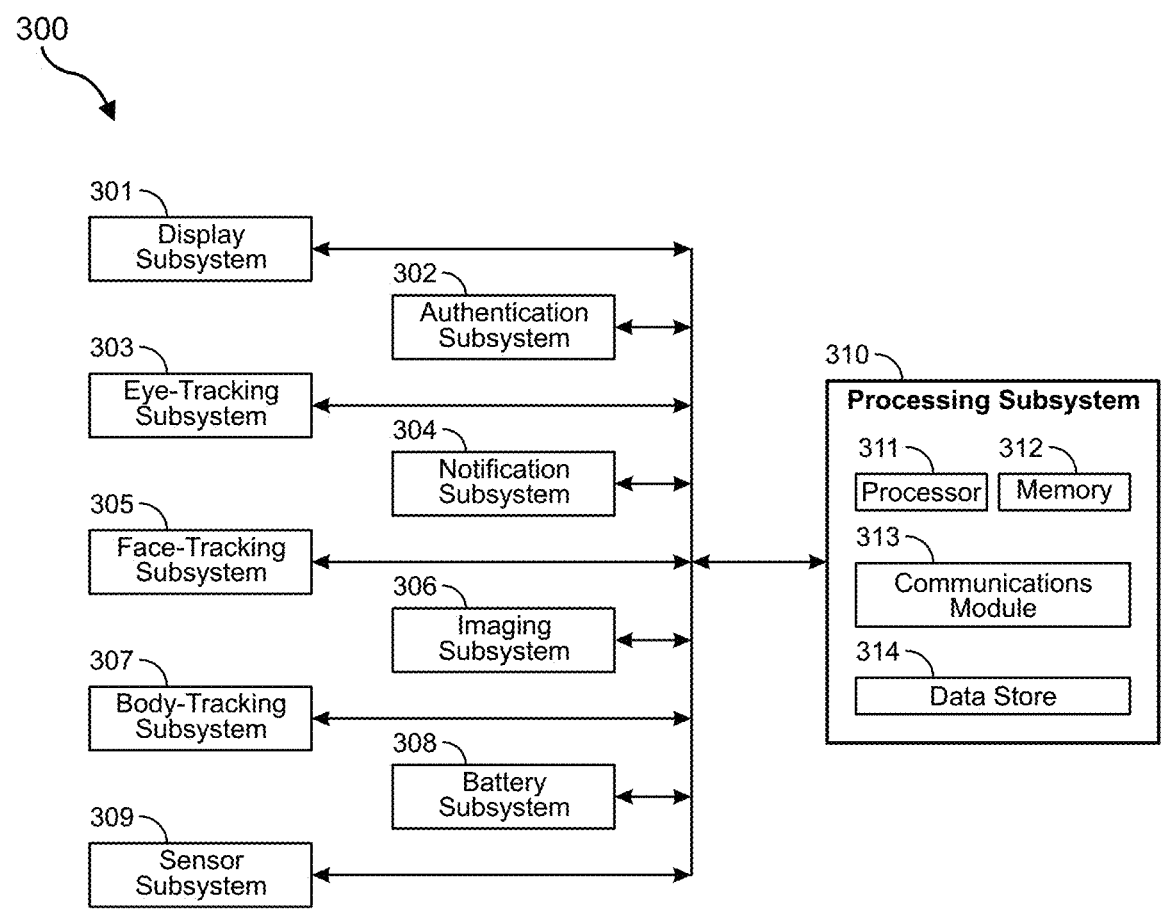
FIG. 3 is a block diagram illustrating an exemplary computing architecture for an artificial reality hat.

In addition to a display subsystem, the disclosed artificial reality hats may include a variety of additional subsystems associated with generating and/providing artificial reality experiences. Each of these subsystems may include hardware, software, firmware, and/or other components designed to perform specified functions. FIG. 3 illustrates an exemplary computing architecture 300 in which various subsystems 301-309 may interact with a processing subsystem 310. Any or all of these subsystems 301-309 may be installed on or embedded within the artificial reality hats described herein (such as artificial reality hat 100 of FIG. 1). Substantially any number or any type of subsystem may be included in the artificial reality hats described herein and, as such, the subsystems depicted in FIG. 3 are not intended to be limiting. Moreover, each subsystem may have its own processing subsystem or may interact with a central processing subsystem (such as the processing subsystem 310).

As shown in FIG. 3, the computing architecture 300 may include a display subsystem 301, which may represent and/or include any of the various display components and/or attributes described herein. In this example, the display subsystem 301 may interact with the processing subsystem 310, including any of its various subcomponents. For instance, the display subsystem 301 may interact with a processor 311, memory 312, a communications module 313 (which may include or represent a variety of different wired or wireless connections, such as WiFi, Bluetooth, global positioning system (GPS) modules, cellular or other radios, etc.), and/or a data store 314 (which may include or represent a variety of different volatile or non-volatile data storage devices). In some cases, the processing subsystem 310 may be embedded within on or coupled to an artificial reality hat (such as the artificial reality hat 100 illustrated in FIG. 1). In other cases, the processing subsystem 310 may be separate from and/or external to the artificial reality hat 100 (as part of, e.g., a separate computing device, as described in greater detail below). In some examples, the processing subsystem 310 may include one or more special-purpose, hardware-based accelerators, such as machine-learning accelerators designed to perform tasks associated with computer-vision processing.

In one example, the computing architecture 300 may also include an authentication subsystem 302. This authentication subsystem 302 may be embedded within and/or coupled to artificial reality hats in a variety of ways, such as within the crown portion 101 and/or the brim portion 102 of the artificial reality hat 100 illustrated in FIG. 1. The authentication subsystem 302 may include a variety of different hardware components, such as cameras, microphones, iris scanners, facial scanners, and/or other hardware components (such as the optical sensors and acoustic transducers incorporated into the artificial reality hat illustrated in FIG. 4), each of which may be used to authenticate a user. In some cases, some or all of the functions of the artificial reality hat 100 may be locked until the user is authenticated. For instance, and as will be explained in greater detail below, a user (e.g., the user 104 in FIG. 1) may use the authentication subsystem 302 to authenticate him or herself and, in turn, transition the artificial reality hat 100 from a "locked" state, in which some or all of the hat's functionality is locked, to an "unlocked" state, in which some or all of the hat's functionality is available to the user. In other cases, the authentication subsystem 302 may authenticate the user to a network, for example, that provides data to the artificial reality hat 100.

In some examples, the authentication subsystem 302 may authenticate the user based on the user's detected voice patterns, based on an iris scan of the user, based on a facial scan, based on a fingerprint scan, or based on some other form of biometric authentication. The authentication subsystem 302 may be mounted on or embedded within the disclosed artificial reality hats in a variety of ways, including within the hat's crown and/or brim. In some examples, the authentication subsystem 302 may be part of an external device (described below) to which the artificial reality hat is connected.

In some embodiments, the computing architecture 300 may also include an eye-tracking subsystem 303 designed to identify and track various characteristics of a user's eye(s), such as their gaze direction. The eye-tracking subsystem 303 may include a variety of different eye-tracking hardware components or other computer vision components. For example, the eye-tracking subsystem 303 may include optical sensors, such as two-dimensional (2D) or 3D cameras, time-of-flight depth sensors, single-beam or sweeping laser rangefinders, 3D LiDAR sensors, and/or any other suitable type or form of optical sensor. In some examples, a processing subsystem (such as the processing subsystem 310 in FIG. 3) may process data from one or more of these sensors to measure, detect, determine, and/or otherwise monitor the position, orientation, and/or motion of the user's eye(s).

In one example, the eye-tracking subsystem 303 may be configured to identify and measure the inter-pupillary distance (IPD) of a user. In some embodiments, the eye-tracking subsystem 303 may measure and/or calculate the IPD of the user while the user is wearing the artificial reality hat. In these embodiments, the eye-tracking subsystem 303 may detect the positions of a user's eyes and may use this information to calculate the user's IPD.

The eye-tracking subsystem 303 may track a user's eye position and/or eye movement in a variety of ways. In one example, one or more light sources and/or optical sensors (such as eye-tracking components 406A and 406B in FIG. 4) may capture an image of the user's eyes. The eye-tracking subsystem 303 may then use the captured information to determine the user's inter-pupillary distance, interocular distance, and/or a 3D position of each eye relative to artificial reality hat 400 (e.g., for distortion adjustment purposes), including a magnitude of torsion and rotation (i.e., roll, pitch, and yaw) and/or gaze directions for each eye. In one example, infrared light may be emitted by the eye-tracking subsystem 303 and reflected from each eye. The reflected light may be received or detected by an optical sensor (such as eye-tracking components 406A and 406B) and analyzed to extract eye rotation data from changes in the infrared light reflected by each eye.

The eye-tracking subsystem 303 may use any of a variety of different methods to track the eyes of an artificial reality hat user. For example, a light source (e.g., infrared light-emitting diodes) may emit a dot pattern onto each eye of the user. The eye-tracking subsystem 303 may then detect (e.g., via an optical sensor coupled to the artificial reality hat) and analyze a reflection of the dot pattern from each eye of the user to identify a location of each pupil of the user. Accordingly, the eye-tracking subsystem 303 may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display (such as display 203 in FIG. 2A) may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by "pupil swim" by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem 303 to make automated adjustments for a user's IPD.

In some embodiments, the display subsystem 301 discussed above may include a variety of additional subsystems that may work in conjunction with the eye-tracking subsystem 303. For example, the display subsystem 301 may include a varifocal actuation subsystem, a scene-rendering module, and a vergence processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem 301. The varifocal subsystem may also be integrated into or separate from the actuation subsystem and/or the eye-tracking subsystem 303.

In one example, the display subsystem 301 may include a vergence processing module configured to determine a vergence depth of a user's gaze based on a gaze point and/or an estimated intersection of the gaze lines determined by the eye tracking subsystem 303. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence processing module may coordinate with the eye-tracking subsystem 303 to make adjustments to the display subsystem 301 to account for a user's vergence depth. When the user is focused on something at a distance, the user's pupils may be slightly farther apart than when the user is focused on something close. The eye-tracking subsystem 303 may obtain information about the user's vergence or focus depth and may adjust the display subsystem 301 to be closer together when the user's eyes focus or verge on something close and to be farther apart when the user's eyes focus or verge on something at a distance.

Figure 5:
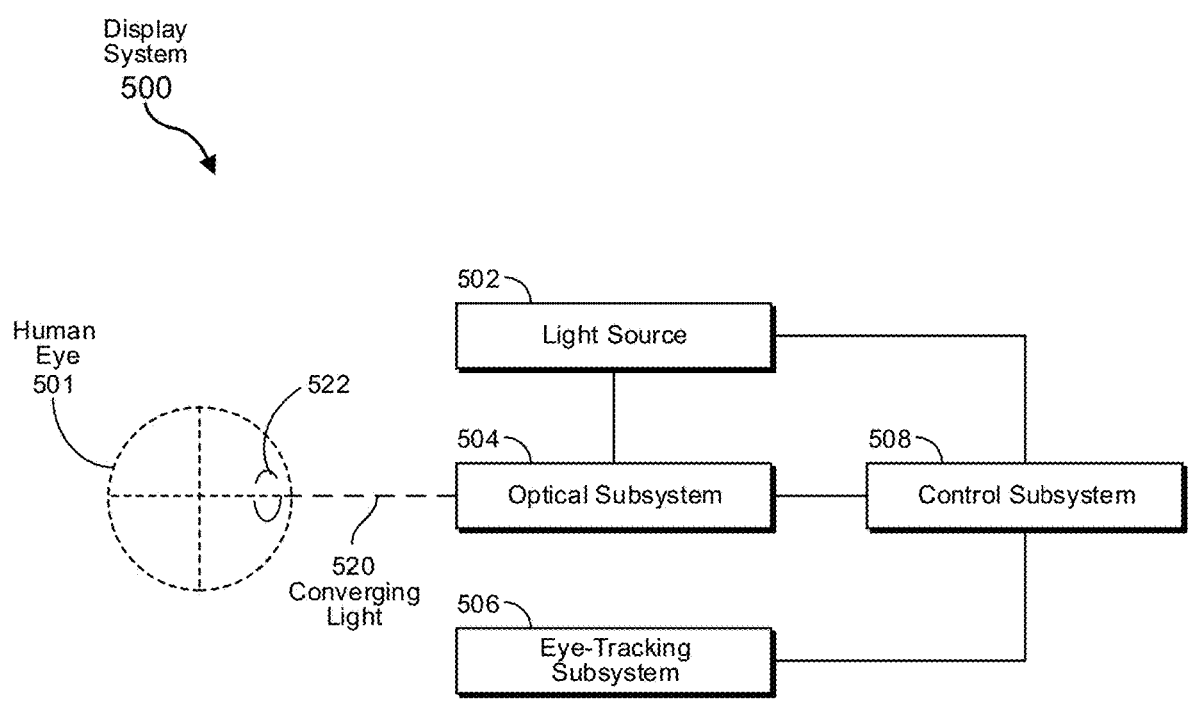
FIG. 5 is an illustration of an exemplary display system that can be incorporated into an artificial reality hat.

As detailed above, the display subsystem 301 and the eye-tracking subsystem 303 described herein may be configured in a number of different ways and may include a variety of elements and components. FIG. 5 is an illustration of an exemplary display system that incorporates an eye-tracking subsystem capable of tracking a user's eye(s). As depicted in FIG. 5, a display system 500 may include a light source 502, an optical subsystem 504, an eye-tracking subsystem 506, and/or a control subsystem 508. In some examples, the light source 502 may generate light for an image (e.g., to be presented to an eye 501 of the viewer). The light source 502 may represent any of a variety of suitable devices. For example, the light source 502 can include a two-dimensional projector (e.g., a LCoS display), a scanning source (e.g., a scanning laser), or other device (e.g., a LCD, an LED display, an OLED display, an active-matrix OLED display (AMOLED), a transparent OLED display (TOLED), a waveguide, or some other display capable of generating light for presenting an image (e.g., a virtual image) to the viewer). In some examples, the image may represent a virtual image, which may refer to an optical image formed from the apparent divergence of light rays from a point in space, as opposed to an image formed from the light ray's actual divergence.

In some embodiments, the optical subsystem 504 may receive the light generated by the light source 502 and generate, based on the received light, converging light 520 that includes the image. In some examples, the optical subsystem 504 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of the converging light 520. Further, various mechanical couplings may serve to maintain the relative spacing and/or the orientation of the optical components in any suitable combination.

In one embodiment, the eye-tracking subsystem 506 may generate tracking information indicating a gaze angle of an eye 501 of the viewer. In some examples, the phrase "eye tracking" may refer to a process by which the position, orientation, and/or motion of an eye is measured, detected, sensed, determined, and/or monitored. The disclosed systems may measure the position, orientation, and/or motion of an eye in a variety of different ways, such as using various optical-based eye-tracking techniques, ultrasound-based eye-tracking techniques, etc.

In one example, the control subsystem 508 may control aspects of the optical subsystem 504 (e.g., the angle of incidence of the converging light 520) based at least in part on this tracking information. Additionally, in some examples, the control subsystem 508 may store and utilize historical tracking information (e.g., a history of the tracking information over a given duration, such as the previous second or fraction thereof) to anticipate the gaze angle of the eye 501 (e.g., an angle between the visual axis and the anatomical axis of the eye 501). In some embodiments, the eye-tracking subsystem 506 may detect radiation emanating from some portion of the eye 501 (e.g., the cornea, the iris, the pupil, or the like) to determine the current gaze angle of the eye 501. In other examples, the eye-tracking subsystem 506 may employ a wavefront sensor to track the current location of the pupil.

Any number of techniques can be used to track the eye 501. Some techniques may involve illuminating the eye 501 with infrared light and measuring reflections with at least one optical sensor that is tuned to be sensitive to the infrared light. Information about how the infrared light is reflected from the eye 501 may be analyzed to determine the position(s), orientation(s), and/or motion(s) of one or more eye feature(s), such as the cornea, pupil, iris, and/or retinal blood vessels.

In some examples, the radiation captured by a sensor of the eye-tracking subsystem 506 may be digitized (i.e., converted to an electronic signal). Further, the sensor may transmit a digital representation of this electronic signal to one or more processors (for example, processors associated with a device including the eye-tracking subsystem 506). The eye-tracking subsystem 506 may include any of a variety of sensors in a variety of different configurations. For example, the eye-tracking subsystem 506 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of the eye-tracking subsystem 506 to track the movement of the eye 501. In another example, these processors may track the movements of the eye 501 by executing algorithms represented by computer instructions stored on non-transient memory. In some examples, on-chip logic (e.g., an application-specific integrated circuit, ASIC) may be used to perform at least portions of such algorithms. As noted, the eye-tracking subsystem 506 may be programmed to use an output of the sensor(s) to track movement of the eye 501. In some embodiments, the eye-tracking subsystem 506 may analyze the digital representation generated by the sensors to extract eye rotation information from changes in reflections. In one embodiment, the eye-tracking subsystem 506 may use corneal reflections or glints (also known as Purkinje images) and/or the center of the eye's pupil 522 as features to track over time.

In some embodiments, the eye-tracking subsystem 506 may use the center of the eye's pupil 522 and infrared or near-infrared, non-collimated light to create corneal reflections. In these embodiments, the eye-tracking subsystem 506 may use the vector between the center of the eye's pupil 522 and the corneal reflections to compute the gaze direction of eye the 501. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, the eye-tracking subsystem 506 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then the eye 501 may act as a retroreflector as the light reflects off the retina, thereby creating a bright pupil effect similar to a red eye effect in photography. If the illumination source is offset from the optical path, then the eye's pupil 522 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, the control subsystem 508 may control the light source 502 and/or the optical subsystem 504 to reduce optical aberrations (e.g., chromatic aberrations and/or monochromatic aberrations) of the image that may be caused by or influenced by the eye 501 of the viewer. In some examples, as mentioned above, the control subsystem 508 may use the tracking information from the eye-tracking subsystem 506 to perform such control. For example, in controlling the light source 502, the control subsystem 508 may alter the light generated by the light source 502 (e.g., by way of image rendering) to modify (e.g., pre-distort) the image so that the aberration of the image caused by the eye 501 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as contact lens worn by the user. In some embodiments, ophthalmic correction elements (e.g., adjustable lenses) may be directly incorporated into the artificial reality hats described herein. In some examples, the color of the user's eye may necessitate modification of a corresponding eye-tracking algorithm(s). For example, eye-tracking algorithm(s) may need to be modified based at least in part on the differing color contrast between a brown eye and, for example, a blue eye.

FIG. 6 is a more detailed illustration of various aspects of the eye-tracking subsystem illustrated in FIG. 5. As shown in this figure, an eye-tracking subsystem 600 may include at least one source 604 and at least one sensor 606. The source 604 generally represents any type or form of element capable of emitting radiation. In one example, the source 604 may generate visible, infrared, and/or near-infrared radiation. In some examples, the source 604 may radiate non-collimated infrared and/or near-infrared portions of the electromagnetic spectrum towards an eye 602 of a user. The source 604 may utilize a variety of sampling rates and speeds. For example, the disclosed systems may use sources with higher sampling rates in order to capture fixational eye movements of a user's eye 602 and/or to correctly measure saccade dynamics of the user's eye 602. As noted above, any type or form of eye-tracking technique may be used to track the user's eye 602, including optical-based eye-tracking techniques, ultrasound-based eye-tracking techniques, etc.

The sensor 606 generally represents any type or form of element capable of detecting radiation, such as radiation reflected off the user's eye 602. Examples of the sensor 606 include, without limitation, a charge coupled device (CCD), a photodiode array, a complementary metal-oxide-semiconductor (CMOS) based sensor device, and/or the like. In one example, the sensor 606 may represent a sensor having predetermined parameters, including, but not limited to, a dynamic resolution range, linearity, and/or other characteristic selected and/or designed specifically for eye tracking.

As detailed above, the eye-tracking subsystem 600 may generate one or more glints. As detailed above, a glint 603 may represent reflections of radiation (e.g., infrared radiation from an infrared source, such as the source 604) from the structure of the user's eye. In various embodiments, the glint 603 and/or the user's pupil may be tracked using an eye-tracking algorithm executed by a processor (either within or external to the artificial reality device). For example, an artificial reality device may include a processor and/or memory in order to perform eye tracking locally and/or a transceiver to send and receive the data necessary to perform eye tracking on an external device (e.g., a mobile phone, cloud server, or other computing device).

FIG. 6 shows an example image 605 captured by an eye-tracking subsystem, such as the eye-tracking subsystem 600. In this example, the image 605 may include both the user's pupil 608 and a glint 610 near the same. In some examples, the pupil 608 and/or the glint 610 may be identified using an artificial-intelligence-based algorithm, such as a computer-vision-related algorithm. In one embodiment, the image 605 may represent a single frame in a series of frames that may be analyzed continuously in order to track the eye 602 of the user. Further, the pupil 608 and/or the glint 610 may be tracked over a period of time to determine a user's gaze.

The eye-tracking information generated by the above-described eye-tracking subsystem may be used, for example, to modify various aspect of how different computer-generated images are presented. In some embodiments, for example, a display subsystem (e.g., display subsystem 301 in FIG. 3) may be configured to modify, based on information generated by the eye-tracking subsystem (e.g., eye-tracking subsystem 303 in FIG. 3), at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

Figure 4:
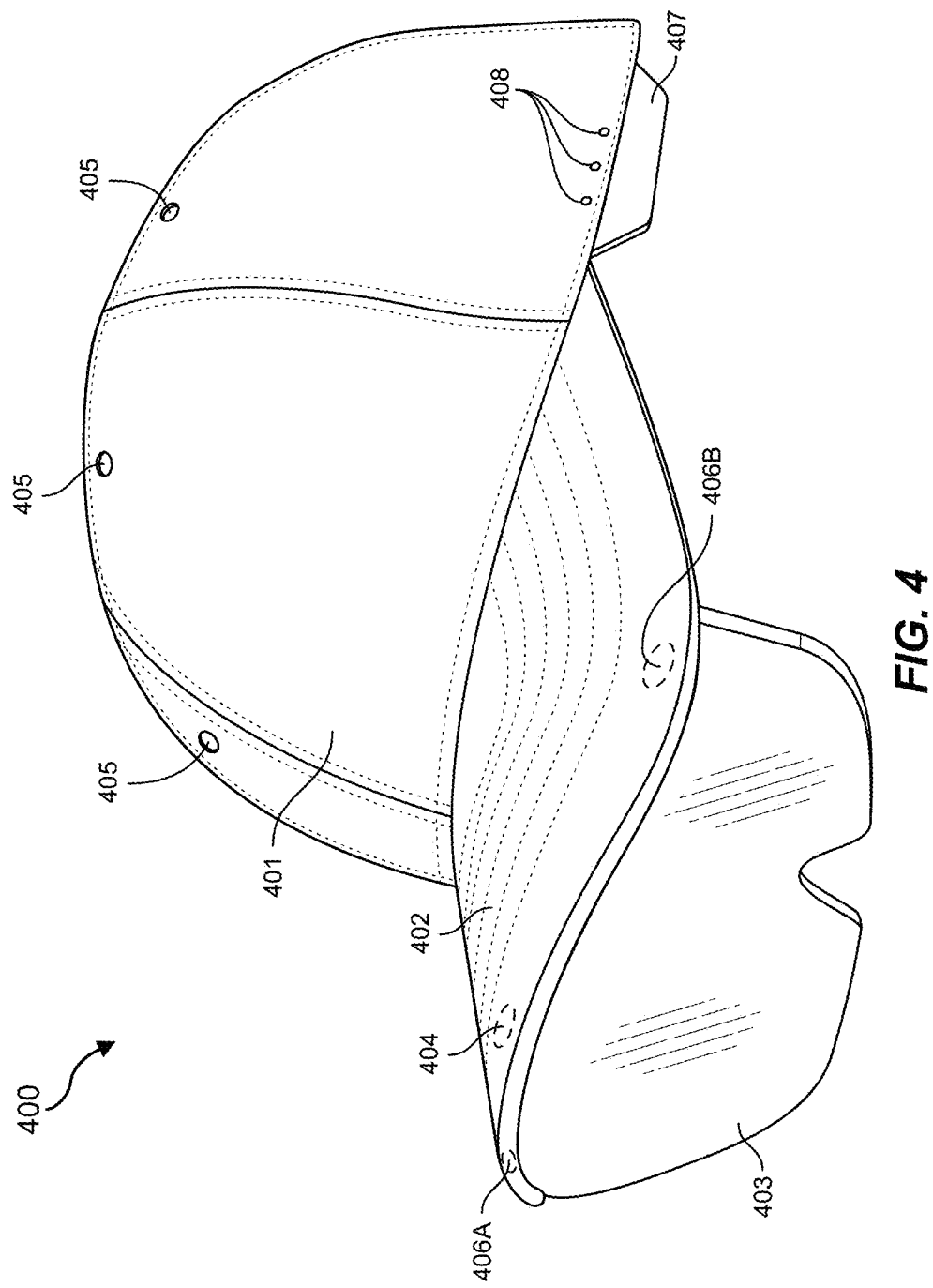
FIG. 4 is an illustration of an additional embodiment of an artificial reality hat that includes a variety of sensing elements.

The above-described eye-tracking subsystems may be incorporated within and/or coupled to the artificial reality hats disclosed herein in a variety of ways. In one example, all or a portion of these eye-tracking subsystems may be embedded within and/or attached to the brim portion of an artificial reality hat. For example, and as shown in FIG. 4, one or more eye-tracking components 406A and 406B (which may represent, e.g., one or more light sources and/or optical sensors) may be embedded within and/or positioned near the end of a brim portion 402 of the artificial reality hat 400. By doing so, the eye-tracking components 406A/406B may have a direct line-of-sight view of the user's eyes. This may, in turn, enable the above-described eye-tracking subsystem 303 to perform in-field eye tracking, thereby obviating the need for any of the complicated out-of-field hardware configurations (such as out-of-field lasers or hot mirrors) that are commonly employed in conventional eyewear-based form factors. By doing so, the artificial reality hats disclosed herein may reduce the complexity of (and improve the accuracy of) their associated eye-tracking subsystems.

Returning to FIG. 3, in some embodiments the computing architecture 300 may also include a face-tracking subsystem 305 and/or a body-tracking subsystem 307 configured to identify and track the movement of, and/or various characteristics of, a user's face and/or other body parts. In some examples, the face-tracking subsystem 305 and/or the body-tracking subsystem 307 may include one or more body- and/or face-tracking light sources and/or optical sensors, such as face/body-tracking component 404 in FIG. 4, along with potentially other sensors or hardware components. These components may be positioned or directed toward the user's face and/or body so as to capture movements of the user's mouth, cheeks, lips, chin, etc., as well as potentially movement of the user's body, including their arms, legs, hands, feet, torso, etc.

As noted, the face-tracking subsystem 305 may be configured to identify and track facial expressions of a user. These facial expressions may be identified by tracking movements of individual parts of the user's face, as detailed above. The user's facial expressions may change over time and, as such, the face-tracking subsystem 305 may be configured to operate on a continuous or continual basis to track the user's changing facial expressions. Classifications of these facial expressions may be stored in the data store 314 of the processing subsystem 310.

Similarly, the body-tracking subsystem 307 may be configured to identify and track a position of substantially any part of the user's body. For example, the body-tracking subsystem 307 may (via, e.g., the face/body-tracking component 404, the processing subsystem 310, and/or the data store 314) log initial positions for a user's arms, hands, legs, or feet and may note how those body parts move over time. In some cases, these body movements may be used as inputs to a processing subsystem of the artificial reality hat 400. For example, if a user wants to open or close the display in FIG. 4, the user may wave their hand or arm in a certain manner or perform a certain gesture (such as a snap or finger-closing motion). Or, if the user wants to interact with a virtual element presented on the display, the face/body-tracking component 404 (or other components of the body-tracking subsystem 307) may track the user's body movements and use those movements as inputs to interact with an artificial reality generated by the artificial reality hat 400 and/or to interact with software applications running on the processing subsystem 310.

As with the eye-tracking subsystem 303, the face-tracking subsystem 305 and/or the body-tracking subsystem 307 may be incorporated within and/or coupled to the artificial reality hats disclosed herein in a variety of ways. In one example, all or a portion of the face-tracking subsystem 305 and/or the body-tracking subsystem 307 may be embedded within and/or attached to the brim portion of an artificial reality hat. For example, and as shown in FIG. 4, one or more face/body-tracking components 404 (which may represent, e.g., one or more light sources and/or optical sensors) may be embedded within and/or positioned near the end of the brim portion 402 of the artificial reality hat 400. By doing so, the face/body-tracking component(s) 404 may be positioned far enough away from the user's face and/or body to have a clear view of the user's facial expressions and/or facial and body movements. Traditional eyewear-based artificial reality devices, in contrast, are typically positioned too close to the user's face or body to be able to accurately detect the user's facial expressions and/or facial or body movements.

Returning to FIG. 3, in some examples the computing architecture 300 may also include an imaging subsystem 306 configured to image a local environment of the artificial reality hat. This imaging subsystem 306 may include or incorporate any of a variety of different imaging components and elements, such as light sources and optical sensors. For example, and as illustrated in FIG. 4, the imaging subsystem 306 may include one or more world-facing cameras 405 that are configured to capture images of the user's surroundings. These world-facing cameras 405 may be mounted on or coupled to the artificial reality hat 400 in a variety of different positions and patterns. In one example, the images captured by these world-facing cameras 405 may be processed by the processing subsystem 310. In some cases, the images may be stitched together to provide a 360-degree view of the user's local environment. In one embodiment, some or all of this surrounding view may be presented on the display of the artificial reality hat 400. As such, the user may be able to see either to the side or behind themselves simply by viewing the surrounding view presented on the display. While FIG. 4 illustrates the artificial reality hat 400 as having three world-facing cameras 405, the artificial reality hat 400 may have substantially any number of world-facing cameras.

In some embodiments, the artificial reality hat 400 may use the above-described world-facing cameras 405 to map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques used by an artificial reality hat may, for example, use data from optical sensors to determine a user's location. Radios including WiFi, Bluetooth, GPS, cellular, or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. The artificial reality hat 400 may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to the artificial reality hat 400 on demand.

Returning to FIG. 3, in some examples the computing architecture 300 may include a sensor subsystem 309 configured to detect, and generate sensor data that reflects, changes in a local environment of the artificial reality hat. The sensor subsystem 309 may include a variety of different sensors and sensing elements, examples of which include, without limitation, a position sensor, an inertial measurement unit (IMU), a depth camera assembly, an audio sensor, a video sensor, a location sensor (e.g., GPS), a light sensor, and/or any sensor or hardware component from any another subsystem described herein. In embodiments in which the sensors include an IMU, the IMU may generate calibration data based on measurement signals from the sensor(s). Examples of IMUs may include, without limitation, accelerometers, gyroscopes, magnetometers, other suitable types of sensors that detect motion, sensors used for error correction of the IMU, or some combination thereof.

The above-described sensor data may include a change in location (e.g., from a GPS location sensor), a change in audible surroundings (e.g., from an audio sensor), a change in visual surroundings (e.g., from a camera or other light sensor), a change in inertia (e.g., from an IMU), or other changes that may indicate that the user's environment has changed. A change in the amount of ambient light, for example, may be detected by a light sensor. In response to the detected increase in ambient light, the display subsystem 301 (in conjunction with the processing subsystem 310) may increase the brightness of the display (e.g., the display in FIG. 4). An increase in ambient sound (e.g., as detected by an input audio transducer) may result in an increase in sound amplitude (e.g., in an output audio transducer). Other environmental changes may also be detected and implemented as feedback within the artificial reality hat's computing environment.

The sensor subsystem 309 may be incorporated within and/or coupled to the artificial reality hats disclosed herein in a variety of ways. For example, all or a portion of the sensor subsystem 309 may be positioned substantially anywhere on the crown portion 401 and/or the brim portion 402 of the artificial reality hat 400 illustrated in FIG. 4. In some cases, the sensor subsystem 309 may generate measurement signals in response to motion of the artificial reality hat 400.

In one example, and as shown in FIG. 4, the artificial reality hat 400 may include one or more acoustic transducers, such as output audio transducer 407 and input audio transducers 408. The input audio transducers 408 may represent transducers that detect air pressure variations induced by sound waves. For example, each input audio transducer 408 may be configured to detect sound and convert the detected sound into an electronic format (e.g., an analog or digital format). The output audio transducers 407, in contrast, may provide audio feedback and/or content to a user. Examples of output audio transducers include voice coil speakers, ribbon speakers, electrostatic speakers, piezoelectric speakers, bone conduction transducers, cartilage conduction transducers, and/or any other suitable type or form of audio transducer. Similarly, examples of the input audio transducers 408 may include condenser microphones, dynamic microphones, ribbon microphones, and/or any other type or form of input transducer. In some embodiments, a single transducer may be used for both audio input and audio output.

The configuration of the acoustic transducers 407/408 may vary. In some embodiments, using higher numbers of acoustic transducers may increase the amount of audio information collected and/or the sensitivity and accuracy of the audio information. In contrast, using a lower number of acoustic transducers may decrease the computing power required by a processing subsystem to process the collected audio information. In addition, the position of each acoustic transducer may vary. For example, the position of an acoustic transducer may include a defined position relative to a user, a defined coordinate on the artificial reality hat 400, an orientation associated with each acoustic transducer, or some combination thereof.

The acoustic transducers 407/408 may be positioned relative to different parts of the user's ear, such as behind the pinna or within the auricle or fossa. In some cases, the acoustic transducers 407 and/or 408 may represent bone conduction transducers. These bone conduction transducers may be positioned within the crown portion 401 of the artificial reality hat 400, over or behind the user's ears. The bone conduction transducers may be configured to generate bone-conduction vibrations that are translatable into sounds heard within the user's ear. For example, bone conduction transducers may be positioned along a band of an artificial reality hat such that, when the hat is donned by a user, the transducers have consistent contact with a user's skin over a portion of bone near the user's ear.

Additionally or alternatively, other acoustic transducers may be positioned on or extend from an artificial reality hat such that the transducers surround the user's ear and/or extend toward or inside a users' ear canal. Having an acoustic transducer (such as a microphone array) positioned next to an ear canal of a user may enable the microphone array to collect information on how sounds arrive at the ear canal. By positioning at least two of these acoustic transducers on either side of a user's head (e.g., as binaural microphones), the artificial reality hat 400 may simulate binaural hearing and capture a 3D stereo sound field around about a user's head. In some embodiments, the acoustic transducers may be connected to the artificial reality hat 400 via a wired connection and/or via a wireless connection (e.g., a Bluetooth connection).

In some examples, the acoustic transducers may be oriented such that they are able to detect sounds in a wide range of directions surrounding the user wearing the artificial reality hat 400. In some embodiments, an optimization process may be performed during manufacturing of the artificial reality hat 400 to determine the relative position of each acoustic transducer.

When a user is wearing the artificial reality hat 400 in a given environment, the user may be interacting with other users or other electronic devices that serve as audio sources. In some cases, it may be desirable to determine where the audio sources are located relative to the user and then present audio from the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, a subsystem of the artificial reality hat 400 (such as the processing subsystem 310 in FIG. 3) may initiate a direction-of-arrival (DOA) analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. In these embodiments, the artificial reality hat 400 may provide an alignment and orientation guide, which the user may follow to customize the sound signal presented to the user based on their unique HRTF. In some embodiments, the artificial reality hat 400 may use a variety of different array transfer functions (e.g., any of the DOA algorithms identified above) to estimate the direction of arrival for the sounds. Once the direction of arrival has been determined, the artificial-reality hat 400 may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, the artificial reality hat 400 may perform localization based on information received from other types of sensors, such as the sensor subsystem 309 in FIG. 3. These sensors may include cameras, IR sensors, heat sensors, motion sensors, GPS receivers, or in some cases, sensors that detect a user's eye movements. For example, as noted above, artificial reality hat 400 may include an eye-tracking subsystem 303 that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). The artificial reality hat 400 may include one or more acoustic sensors that detect sounds within range of the device. A processing subsystem of the artificial reality hat 400 (such as the processing subsystem 310) may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial reality hat 400 may re-render (i.e., spatialize) the sound signals to sound as if coming from the direction of that sound source. The artificial reality hat 400 may apply filters or other digital signal processing that alter the intensity, spectra, or arrival time of the sound signal. The digital signal processing may be applied in such a way that the sound signal is perceived as originating from the determined location. The artificial reality hat 400 may amplify or subdue certain frequencies or change the time that the signal arrives at each ear. In some cases, the artificial reality hat 400 may create an acoustic transfer function that is specific to the location of the device and the detected direction of arrival of the sound signal. In some embodiments, the artificial reality hat 400 may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality hat 400 (or speakers associated with the device) may re-render an audio signal to sound as if originating from a specific location.

Figure 7:
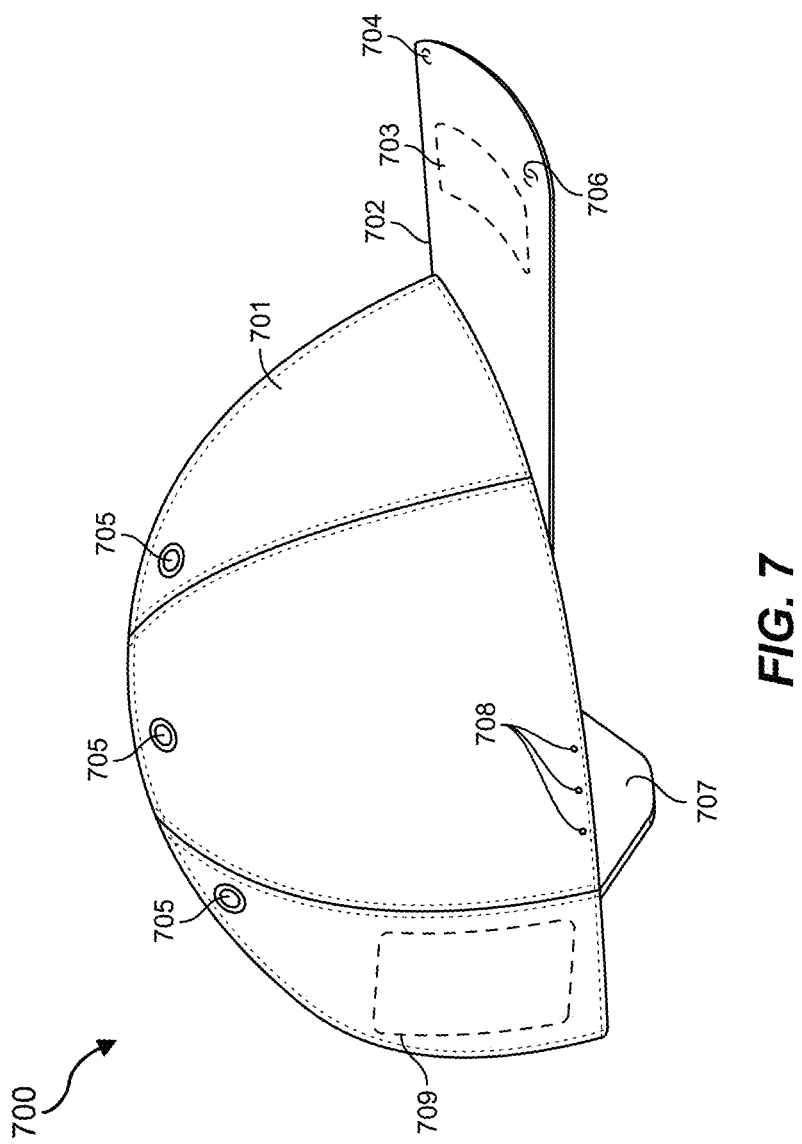
FIG. 7 is a side view of an exemplary artificial reality hat that includes one or more embedded computing components.

Returning to FIG. 3, in some examples the computing architecture 300 may also include a battery subsystem 308 configured to provide electrical power for the artificial reality hat. The battery subsystem 308 may include a variety of different components and elements, examples of which include, without limitation, lithium ion batteries, lithium-polymer batteries, primary lithium batteries, alkaline batteries, or any other form of power source or power storage device. The battery subsystem 308 may be incorporated into and/or otherwise associated with the artificial reality hats disclosed herein in a variety of ways. In some examples, all or a portion of the battery subsystem 308 may be embedded or disposed within a back portion or area of the artificial reality hat. For example, and as illustrated in FIG. 7, a battery 709 may be embedded within the back area of a crown portion 701 of an artificial reality hat 700. In this example, the weight of the battery 709 may offset the weight any other components (such as the computing components and/or sensors described herein, such as sensors 704-706) disposed in a brim 702 (and/or a crown 701) of the artificial reality hat 700. By doing so, the artificial reality hat 700 may be more comfortable for users to wear since the hat may be properly balanced front to back. In another example, all or a portion of the battery subsystem 308 may be positioned within an external device, such as the paired devices described below.

As detailed above, the various components and subsystems of the computing architecture 300 may be embedded within and/or coupled to the artificial reality hats disclosed herein in a variety of ways. In one example, and as shown in FIG. 7, the processing subsystem 310 of FIG. 3 may be coupled to or embedded in the brim 702 of the artificial reality hat 700. As shown in FIG. 7, the area 703 drawn in dotted lines may represent the footprint of one or more computing components including a processor 311, memory 312, a communications module 313, a data store 314, and/or other computing components such as a special-purpose computing system (e.g., an ASIC or a field-programmable gate array (FPGA). Having computing components mounted on or within the brim 702 of the artificial reality hat 700 may provide a large surface area over which to diffuse and disperse heat to the ambient environment. In addition, because the brim 702 is not in direct contact with the skin of a user, the artificial reality hat 700 may be able to incorporate computing components that generate more heat than would otherwise be tolerable by users of eyewear-based artificial reality devices. Moreover, the footprint illustrated by 703 may indicate that a relatively large number of computing components may be mounted in or on the brim 702, especially when compared with the footprint available for such components on an eyewear-based artificial reality device.

In some examples, the artificial reality hat 700 may include or be connected to an external device (e.g., a paired device), such as a neckband, charging case, smart watch, smartphone, wrist band, other wearable device, hand-held controller, tablet computer, laptop computer, and/or other external compute device, etc. This external device generally represents any type or form of paired device (such as system 1370 in FIG. 13, described in greater detail below).

The external device may be coupled to the artificial reality hat 700 via one or more connectors. The connectors may be wired or wireless and may include electrical and/or non-electrical (e.g., structural) components. In some cases, the artificial reality hat 700 and the external device may operate independently without any wired or wireless connection between them.

Pairing external devices with the artificial reality hat 700 may enable the artificial reality hat 700 to achieve the form factor of a hat while still providing sufficient battery and computation power for expanded capabilities. Some or all of the battery power, computational resources, and/or additional features of the artificial reality hat 700 may be provided by a paired device or shared between a paired device and the artificial reality hat 700, thus reducing the weight, heat profile, and form factor of the artificial reality hat 700 overall while still retaining the desired functionality. For example, the external device may allow components that would otherwise be included on a hat to be included in the external device since users may tolerate a heavier weight load in their pockets, shoulders, or hands than they would tolerate on their heads. The external device may also have a larger surface area over which to diffuse and disperse heat to the ambient environment.

Thus, an external device may allow for greater battery and computation capacity than might otherwise have been possible on a stand-alone headwear device. Since weight carried in the external device may be less invasive to a user than weight carried in the artificial reality hat 700, a user may tolerate wearing a lighter artificial reality hat and carrying or wearing the paired device for greater lengths of time than a user would tolerate wearing a heavy standalone artificial reality hat, thereby enabling users to more fully incorporate artificial-reality environments into their day-to-day activities.

The external device may be communicatively coupled with the artificial reality hat 700 and/or to other devices.

These other devices may provide certain functions (e.g., tracking, localizing, depth mapping, processing, storage, etc.) to the artificial reality hat 700. For example, the external device may include multiple acoustic transducers, such as the acoustic transducers 707 and 708 described above.

A processing subsystem on the external device may process information generated by the sensors on the external device and/or the artificial reality hat 700. For example, the processing subsystem may process information from a microphone array (such as the input audio transducers 708) that describes sounds detected by the microphone array. For each detected sound, the processing subsystem may perform a DOA estimation to estimate a direction from which the detected sound arrived at the microphone array. As the microphone array detects sounds, the processing subsystem may populate an audio data set with the information. In embodiments in which the artificial reality hat 700 includes an inertial measurement unit, the processing subsystem may compute all inertial and spatial calculations from the IMU located on the artificial reality hat 700. A connector may convey information between the artificial reality hat 700 and the external device and between the artificial reality hat 700 and the processing subsystem. The information may be in the form of optical data, electrical data, wireless data, or any other transmittable form. As noted, moving the processing of information generated by the artificial reality hat 700 to the external device may reduce weight and heat in the artificial reality hat 700, making it more comfortable to the user.

Returning to FIG. 3, in some examples the computing architecture 300 may also include a notification subsystem 304. This notification subsystem 304 may be configured to generate user notifications that are communicated to the user. The user notifications may include audio-based notifications, haptics-based notifications, visual-based notifications, or other types of notifications. For example, the notification subsystem 304 may generate an audio notification (via, e.g., the acoustic transducers described in connection with FIG. 4) when a text message or email is received (by, e.g., the artificial reality hat and/or an external device). In other cases, various haptic transducers (as described further below in connection with FIG. 8) may buzz or vibrate to instruct a user to move the display screen (e.g., the display of FIG. 4) down from its storage position to a viewing position.

In another example, an IR camera may detect another artificial reality device within the same room and/or an audio sensor may detect an inaudible frequency emitted by the other artificial reality device. In this example, the artificial reality hat 400 may display a message on the display instructing the user to switch to artificial reality mode so that the artificial reality hat 400 and the detected device may interact. Many other types of notifications are also possible. In some cases, the artificial reality hat 400 may respond automatically to the notification, while in other cases, the user may perform some type of interaction to respond to the notification.

Figure 8:
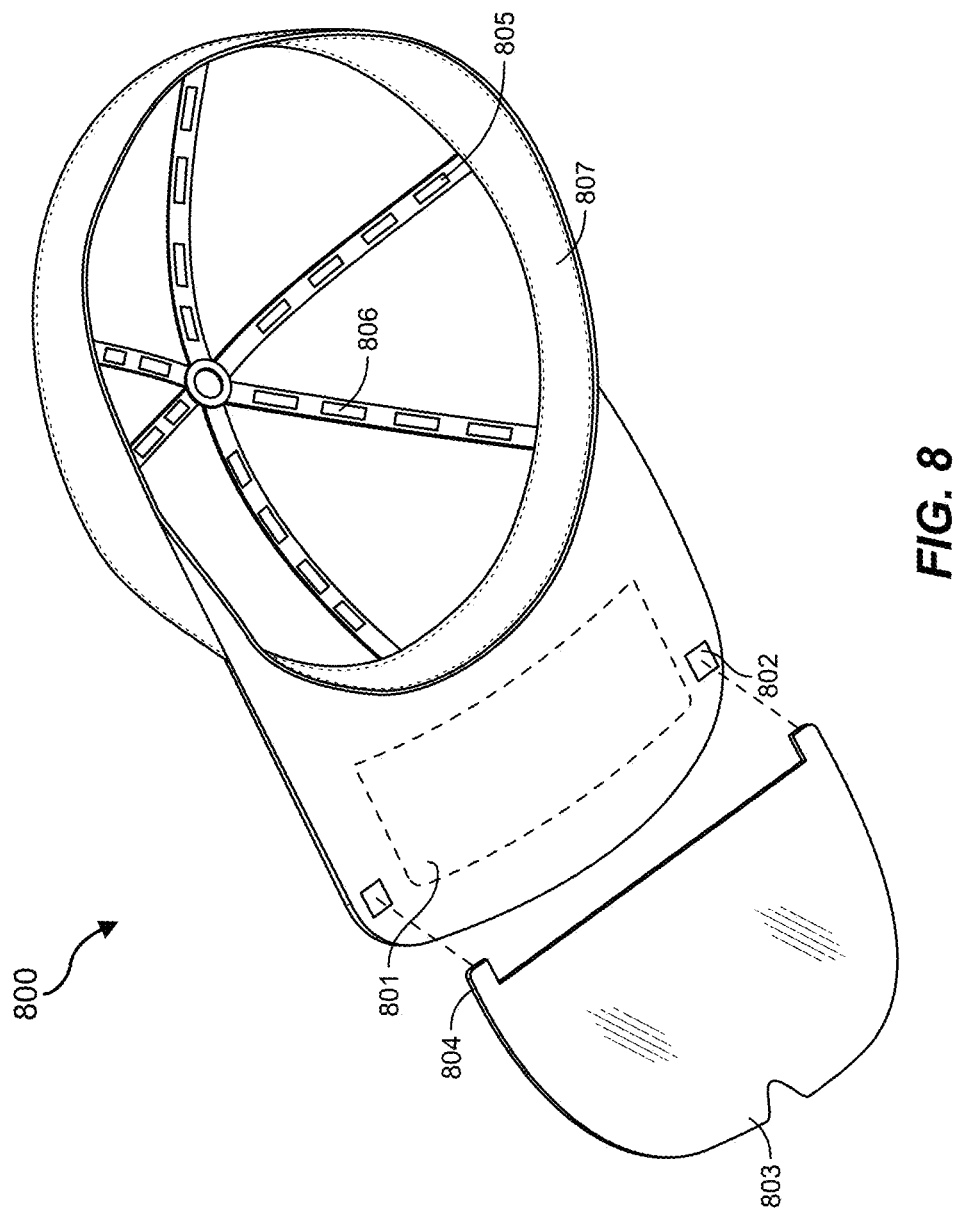
FIG. 8 is a bottom perspective view of an exemplary artificial reality hat that includes one or more embedded haptic and/or brain-computer-interface components.

In some examples, the notification subsystem 304 may include one or more haptic components disposed in various locations. For example, and as illustrated in FIG. 8, a plurality of haptic transducers 805 may be positioned within the crown portion of an artificial reality hat 800. These haptic transducers 805 may be configured to generate haptic outputs, such as buzzes or vibrations. The haptic transducers 805 may be positioned within the artificial reality hat 800 in a variety of ways, including within the crown, within the hat's sweatband, within the hat's brim, or within other parts of the artificial reality hat 800. Additionally or alternatively, the haptic transducers 805 may be disposed on the outer top or bottom edges or on the edge or rim of the artificial reality hat 800. Users may be able to detect haptic sensations from substantially any location on the artificial reality hat 800 and, as such, the haptic transducers 805 may be disposed throughout the hat.

In some cases, the haptic transducers 805 may be disposed on or within the artificial reality hat 800 in patterns. For instance, the haptic transducers 805 may be arranged in rows or circles or lines throughout the artificial reality hat 800. These haptic transducers 805 may be actuated at different times to generate different patterns that may be felt by the user. In some examples, the haptic transducers 805 may be actuated in a certain manner to correspond to a particular notification. For instance, a short buzz on the right side of the artificial reality hat 800 may indicate that the user has received a text message. A pattern of two short vibrations on the left side of the artificial reality hat 800 may indicate that the user is receiving a phone call or may also indicate who that phone call is from. A string of vibrations from successive haptic transducers 805 arranged in a row may indicate that an interesting artificial reality feature is available in the user's current location and that the user should consider lowering the display 803. In addition, a pattern of vibrations that moves from right to left may indicate that the user should take a left turn at an intersection. Many other such notifications are possible, and the above-identified list is not intended to be limiting.

The haptic transducers 805 or other haptic feedback elements may provide various types of cutaneous feedback, including vibration, force, traction, texture, and/or temperature. Haptic transducers 805 may also provide various types of kinesthetic feedback, such as motion and compliance. Haptic feedback may be implemented using motors, piezoelectric actuators, fluidic systems (such as those described in connection with FIG. 16 below), and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, the artificial reality hat 800 may create an entire artificial experience or enhance a user's real-world experience in a variety of contexts and environments. For instance, the artificial reality hat 800 may assist or extend a user's perception, memory, or cognition within a particular environment. The artificial reality hat 800 may also enhance a user's interactions with other people in the real world or may enable more immersive interactions with other people in a virtual world. The artificial reality hat 800 may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments. A more detailed description of possible embodiments of, and uses for, haptic and other feedback devices will be provided below in connection with FIGS. 13-16.

In some cases, the user may interact with the processing subsystem 310 and/or with any of the various subsystems 301-309 via tactile or motion-based movements. For instance, a user may press a button or knob or dial (either on the artificial reality hat or within an external device) to respond to a notification. In other cases, the user may perform a gesture with their hands, arms, face, eyes, or other body part. This gesture may be interpreted by the processing subsystem 310 and associated software as a response to the notification.

In some cases, the user may interact with the artificial reality hat just using their brain. As shown in FIG. 8, for example, an artificial reality hat 800 may include at least one brain-computer-interface 806. In one example, this brain-computer-interface 806 may be positioned within the crown portion of the artificial reality hat 800. The brain-computer-interface (BCI) 806 may be configured to detect brain signals that are translatable into user inputs. The BCI may use any of a variety of non-invasive brain activity detection techniques, including using functional near-infrared spectroscopy, using electroencephalography (EEG), using dry active electrode arrays, or using other types of brain-computer-interfaces to detect and determine a user's intentions based on their brain waves and brain wave patterns. In some cases, BCIs may be configured to indicate movement of a hand, a finger, or a limb. In other cases, BCIs may be configured to detect speech patterns and convert the detected speech patterns into written text. This text may be applied in a reply message, for example, to a text or an email. In some cases, the text may be presented on the display 803 as the user thinks the text and as the think-to-text translator forms the words.

As detailed above, the various components of the display subsystem 301 may be coupled to the artificial reality hats described herein in a variety of ways. In some embodiments, a display (such as the display 203 in FIGS. 2A and 2B) may be adjusted to swing or slide down in front of the user's face. In this example, a positioning mechanism may adjustably position the display 203 between a storage position in which the display 203 is positioned in a location that is intended to be substantially outside of the user's field of view (e.g., closed), and a viewing position in which the display 203 is positioned in a location that is intended to be substantially within the user's field of view (e.g., open).

In other examples, and as shown in FIG. 8, a display 803 may be coupled to the brim of an artificial reality hat 800 via one or more anchor points 802 and protrusions 804. In these examples, the protrusions 804 on the display 803 may be designed to fit into corresponding anchor points 802 defined in the brim of the artificial reality hat 800. In some embodiments, the protrusions 804 may include hollow depressions dimensioned to accommodate a pin. The pin may compress on each end and, as such, may slide into corresponding depressions within the anchor points 802. The pin may thus hold the protrusions 804 to the brim of the artificial reality hat 800, thereby securing the display 803 to the brim. In some cases, this pin may allow the display 803 to pivot between open and closed positions. In addition, the pin may connect to a spring that applies a spring force to at least a portion of the display 803, pushing the display 803 downward to the open position.

In some embodiments, the brim portion of the artificial reality hat 800 may include one or more embedded electrical connections. For example, the artificial reality hat 800 may include a coupling mechanism (e.g., anchor points 802 and protrusions 804) configured to releasably couple a removable component (e.g., the display 803) of the artificial reality hat 800 to electrical connections 801 embedded within the brim. In some cases, the display 803 may be fully removable, while in other cases the display 803 may remain physically attached to the brim portion of the artificial reality hat 800 and may pivot from an open position to a closed position. In such embodiments, whether the display 803 is in an open position or a closed position, the display 803 may remain electrically connected to the computing architecture 300 via electrical connections embedded in the artificial reality hat 800.

As detailed above, the artificial reality hats described herein may incorporate a variety of different display devices and components. In one example, as shown in FIG. 9, an artificial reality hat 900 may utilize or include a virtual retina display. The virtual retinal display may include virtual retina display projectors 903 that may be configured to draw or trace a display directly onto the user's eye. A virtual retinal display (VRD), also referred to herein as a retinal scan display (RSD) or retinal projector (RP), may draw a raster display directly onto the retina of the user's eye. The user may then see what appears to be a conventional display floating in space in front of them. As with the other display devices and components described herein, the VRD projectors 903 may be coupled to the brim of the artificial reality hat 900 or to other portions such as the crown 901. In some embodiments, the virtual retina display projectors 903 may incorporate vertical-cavity surface-emitting lasers or other types of lasers configured to draw images on a user's retina. Such lasers are typically powered using a relatively low power amplitude to avoid damaging the user's eyes. In cases where vertical-cavity surface-emitting lasers are incorporated, the artificial reality hat 900 may also include a holographic grating that focuses the lasers on the user's retina.

While a baseball cap has been shown in many of the accompanying figures, substantially any type of hat may be used. Examples of potentially suitable hat-based form factors include, without limitation, baseball hats, trucker hats, fitted or snapback hats, boater hats, western and cowboy hats, fedoras, visors, bowler hats, cloches, gambler hats, ascot and duckbill hats, lifeguard hats, outback hats, panama hats, safari hats, top hats, etc. In some examples, suitable hat-based form factors may be limited brimmed hats (i.e., any type or form of hat that includes at least some form of a brim).

Figure 10:
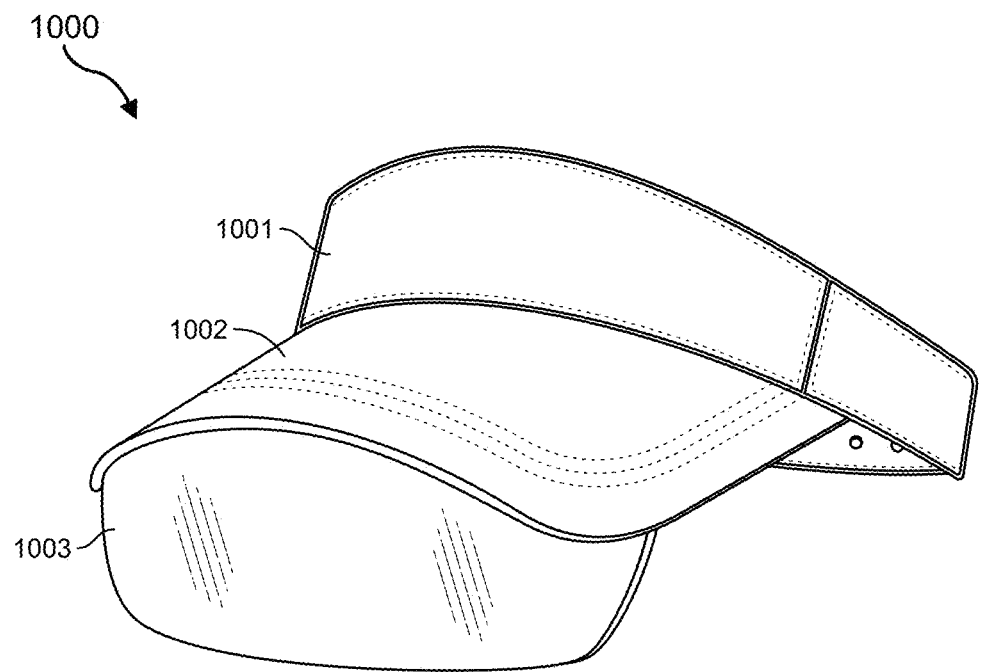
FIG. 10 is a perspective view of an exemplary artificial reality visor.

For example, any of the subsystems 301-310 of FIG. 3 or any of the hardware components of FIGS. 1-2 and 4-9 may be incorporated within and/or coupled to a visor, such as the exemplary visor 1000 illustrated in FIG. 10. Like the baseball caps in the previous examples, the visor 1000 of FIG. 10 may include a crown 1001 and a brim 1002. The visor 1000 may also have a display 1003 that may pivot or slide between open and closed positions. Other hardware components such as audio transducers or haptics components (not shown) may also be installed on or coupled to the visor 1000.

Figure 11:
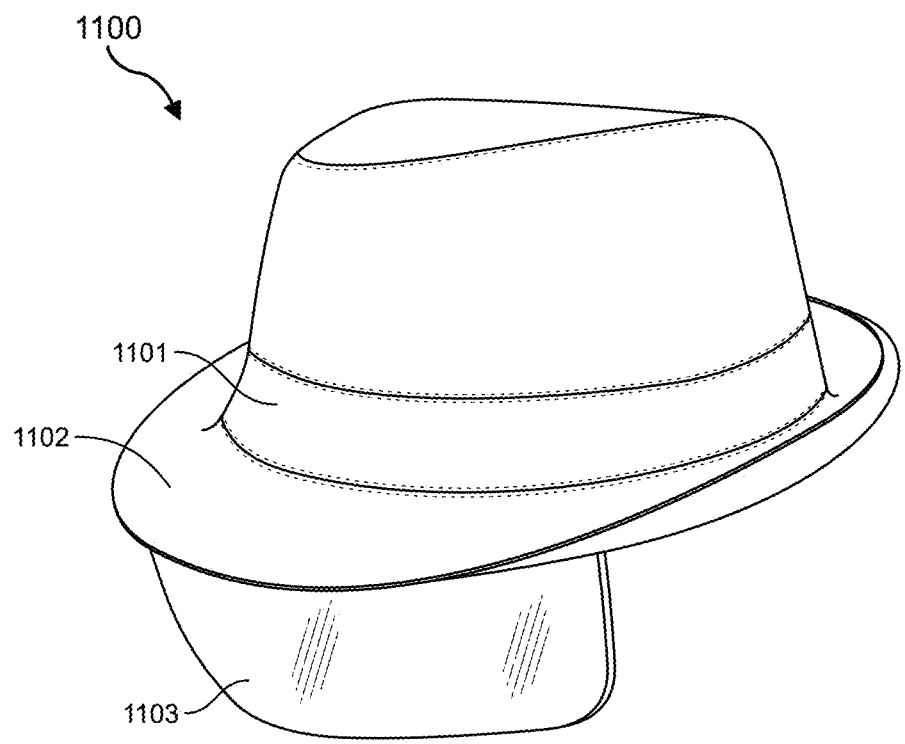
FIG. 11 is a perspective view of an artificial reality fedora.

In another example, any of the components and/or subsystems described herein may be incorporated within a fedora, such as that shown in FIG. 11. In this example, fedora 1100 may include a crown 1001, a brim 1102, and a display 1103. As with the visor illustrated in FIG. 10, any of the subsystems or hardware components described herein may be installed on or coupled to the fedora 1100.

Figure 12:
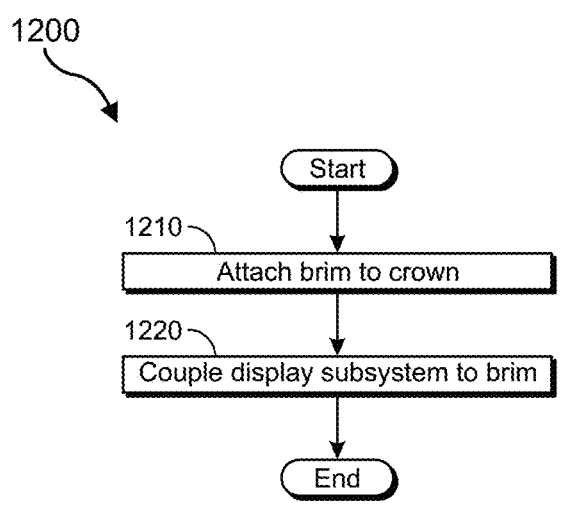
FIG. 12 is a flow diagram of an exemplary method for manufacturing an artificial reality hat.

FIG. 12 is a flow diagram of an exemplary computer-implemented method 1200 for manufacturing an artificial reality hat. The steps shown in FIG. 12 may be performed by any suitable computer-executable code and/or computing system. In one example, each of the steps shown in FIG. 12 may represent an algorithm whose structure includes and/or is represented by multiple sub-steps, examples of which will be provided in greater detail below.

As illustrated in FIG. 12, at step 1210, one or more of the systems described herein may attach a brim portion to a crown portion that is dimensioned to at least partially cover a head of a user. For example, one or more pieces of (potentially computer-automated) manufacturing equipment may attach the brim portion 102 of the artificial reality hat 100 in FIG. 1 to a crown portion 101 that is dimensioned to at least partially cover the head of a user 104. The brim portion 102 may extend from the crown portion 101 in at least a forward direction away from the crown portion 101. In the case of the fedora 1100 of FIG. 11, however, and potentially in other form factors, the brim 1102 may extend fully around the head of the user 104.

The method 1200 may further include, at step 1220, coupling a display subsystem to the brim portion. For example, one or more pieces of (potentially computer-automated) manufacturing equipment may couple the display subsystem 103 in FIG. 1 to the brim portion 102 of the artificial reality hat 100. In some examples, other components and subsystems may be coupled to the artificial reality hat 100. For example, an eye-tracking subsystem (e.g., eye-tracking subsystem 303 of FIG. 3) that is configured to identify and track at least one characteristic of an eye of the user 104 may be embedded within or otherwise attached to the artificial reality hat 100. A face-tracking subsystem 305 that is configured to identify and track facial expressions of the user 104 may also be positioned within or coupled to the artificial reality hat 100. In addition, a body-tracking subsystem 307 that is configured to identify and track the position of at least a portion of the user's body may be attached or coupled to the artificial reality hat 100. Additionally or alternatively, a processing subsystem 310 that is configured to perform computations for at least one subsystem of the artificial reality hat 100 may be embedded within or otherwise coupled to the hat.

In some examples, different components may be coupled to the crown portion 101 of the artificial reality hat 100. For instance, a bone conduction and/or audio transducer (e.g., acoustic transducers 407 or 408 of FIG. 4) that is configured to generate bone-conduction vibrations that are translatable into sound may be attached or coupled to the artificial reality hat 100. A brain-computer-interface sensor (e.g., brain-computer-interface 806 of FIG. 8) that is configured to detect brain signals that are translatable into user input may also be embedded within or coupled to the artificial reality hat 100. In addition, haptic transducers (e.g., haptic transducers 805 of FIG. 8) that are configured to generate haptic outputs may also be installed in or coupled to the artificial reality hat 100. A battery subsystem (e.g., the battery subsystem 308 of FIG. 3) configured to provide electrical power for the artificial reality hat may also be embedded within or coupled to the artificial reality hat 100.

In this manner, an artificial reality hat may be manufactured and operated. Such an artificial reality hat may include many different subsystems that allow it to perform a wide variety of features. Many of these features, such as eye-tracking, face-tracking, body-tracking, and full 360-degree environment imaging may not be possible or may only be inadequately performed on a traditional eyewear-based artificial reality device. In addition, the artificial reality hats described herein may accommodate additional (and more complex) hardware components, and place the same in more optimal positions, than is possible with conventional eyewear-based form factors. Additionally, the disclosed artificial reality hats may distribute the weight of these components more evenly and/or may provide more surface area for heat dissipation, resulting in improved user comfort. As such, the artificial reality hats described herein may provide many advantages over existing artificial reality form factors and systems.

EXAMPLE EMBODIMENTS

Example 1: An artificial reality hat comprising: a crown portion dimensioned to at least partially cover a head of a user; a brim portion that extends from the crown portion in at least a forward direction away from the crown portion; and a display subsystem, coupled to the brim portion, that is configured to present computer-generated images.

Example 2. The artificial reality hat of Example 1, further comprising an eye-tracking subsystem, coupled to the brim portion, that is configured to identify and track at least one characteristic of an eye of the user.

Example 3. The artificial reality hat of any of Examples 1 or 2, wherein the display subsystem is configured to modify, based on information generated by the eye-tracking subsystem, at least one aspect of how the computer-generated images are presented.

Example 4. The artificial reality hat of any of Examples 1-3, further comprising a face-tracking subsystem, coupled to the brim portion, that is configured to identify and track facial expressions of the user.

Example 5. The artificial reality hat of any of Examples 1-4, further comprising a body-tracking subsystem, coupled to the brim portion, that is configured to identify and track a position of at least a portion of the user's body.

Example 6. The artificial reality hat of any of Examples 1-5, further comprising a sensor subsystem configured to detect, and generate sensor data that reflects, changes in a local environment of the artificial reality hat.

Example 7. The artificial reality hat of any of Examples 1-6, further comprising an authentication subsystem configured to authenticate use of the artificial reality hat based at least in part on sensor data generated by the artificial reality hat.

Example 8. The artificial reality hat of any of Examples 1-7, further comprising a notification subsystem configured to generate user notifications, wherein the user notifications comprise at least one of: an audio-based notification; a haptics-based notification; or a visual-based notification.

Example 9. The artificial reality hat of any of Examples 1-8, further comprising a processing subsystem that is configured to perform computations for at least one subsystem of the artificial reality hat.

Example 10. The artificial reality hat of any of Examples 1-9, wherein at least a portion of the processing subsystem is disposed within the brim portion.

Example 11. The artificial reality hat of any of Examples 1-10, further comprising at least one brain-computer-interface sensor, positioned within the crown portion, that is configured to detect brain signals that are translatable into user input.

Example 12. The artificial reality hat of any of Examples 1-11, further comprising at least one bone conduction transducer, positioned within the crown portion, that is configured to generate bone-conduction vibrations that are translatable into sound.

Example 13. The artificial reality hat of any of Examples 1-12, further comprising at least one haptic transducer, located within the crown portion, that is configured to generate at least one haptic output.

Example 14. The artificial reality hat of any of Examples 1-13, further comprising at least one environment-facing imaging subsystem configured to image a local environment of the artificial reality hat.

Example 15. The artificial reality hat of any of Examples 1-14, wherein: the crown portion comprises a front area and a back area; the brim portion extends from at least the front area of the crown portion; and the back area of the crown portion comprises at least one battery subsystem configured to provide electrical power for the artificial reality hat.

Example 16. The artificial reality hat of any of Examples 1-15, further comprising a positioning mechanism that couples the display subsystem to the brim portion and that adjustably positions the display subsystem between at least: a storage position in which the display subsystem is positioned in a location that is intended to be substantially outside of the user's field of view; and a viewing position in which the display subsystem is positioned in a location that is intended to be substantially within the user's field of view.

Example 17. A method of manufacturing an artificial reality hat, the method comprising: attaching a brim portion to a crown portion that is dimensioned to at least partially cover a head of a user, wherein the brim portion extends from the crown portion in at least a forward direction away from the crown portion; and coupling a display subsystem to the brim portion, wherein the display subsystem is configured to present computer-generated images.

Example 18. The method of Example 17, further comprising coupling, to the brim portion, at least one of: an eye-tracking subsystem that is configured to identify and track at least one characteristic of an eye of the user; a face-tracking subsystem that is configured to identify and track facial expressions of the user; a body-tracking subsystem that is configured to identify and track the position of at least a portion of the user's body; or a processing subsystem that is configured to perform computations for at least one subsystem of the artificial reality hat.

Example 19. The method of Examples 17 or 18, further comprising coupling, to the crown portion, at least one of: at least one bone conduction transducer that is configured to generate bone-conduction vibrations that are translatable into sound; at least one brain-computer-interface sensor that is configured to detect brain signals that are translatable into user input; at least one haptic transducer that is configured to generate at least one haptic output; or at least one battery subsystem configured to provide electrical power for the artificial reality hat.

Example 20. An artificial reality hat comprising: a crown portion dimensioned to at least partially cover a head of a user; and a brim portion that extends from the crown portion in at least a forward direction away from the crown portion, wherein the brim portion comprises: embedded electrical connections; and a coupling mechanism configured to releasably couple a removable component of an artificial reality system to the embedded electrical connections.

As noted, the artificial-reality systems described herein may be used with a variety of other types of devices to provide a more compelling artificial-reality experience. In some cases, these devices may be haptic interfaces with transducers that provide haptic feedback and/or that collect haptic information about a user's interaction with an environment. For example, the artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
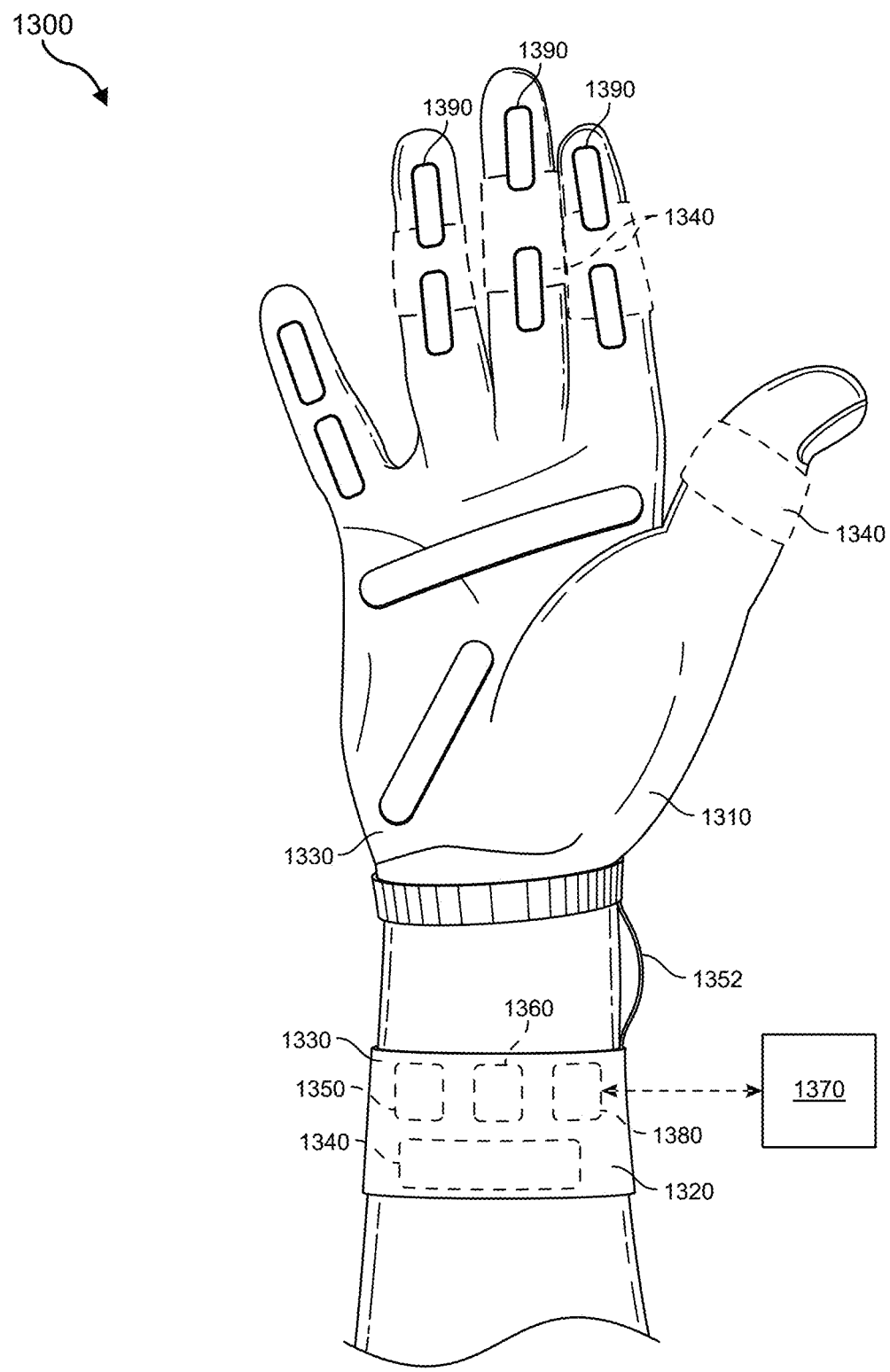
FIG. 13 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). Haptic device 1310 and haptic device 1320 are shown as examples of wearable devices that include a flexible, wearable textile material 1330 that is shaped and configured for positioning against a user's hand and wrist, respectively. In some examples, vibrotactile systems may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned against the user's finger(s), thumb, or wrist, as shown in FIG. 13. Vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1380 may enable communications between vibrotactile system 1300 and the other device or system 1370 via a wireless (e.g., Wi-Fi, Bluetooth, cellular, radio, etc.) link or a wired link. If present, communications interface 1380 may be in communication with processor 1360, such as to provide a signal to processor 1360 to activate or deactivate one or more of the vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
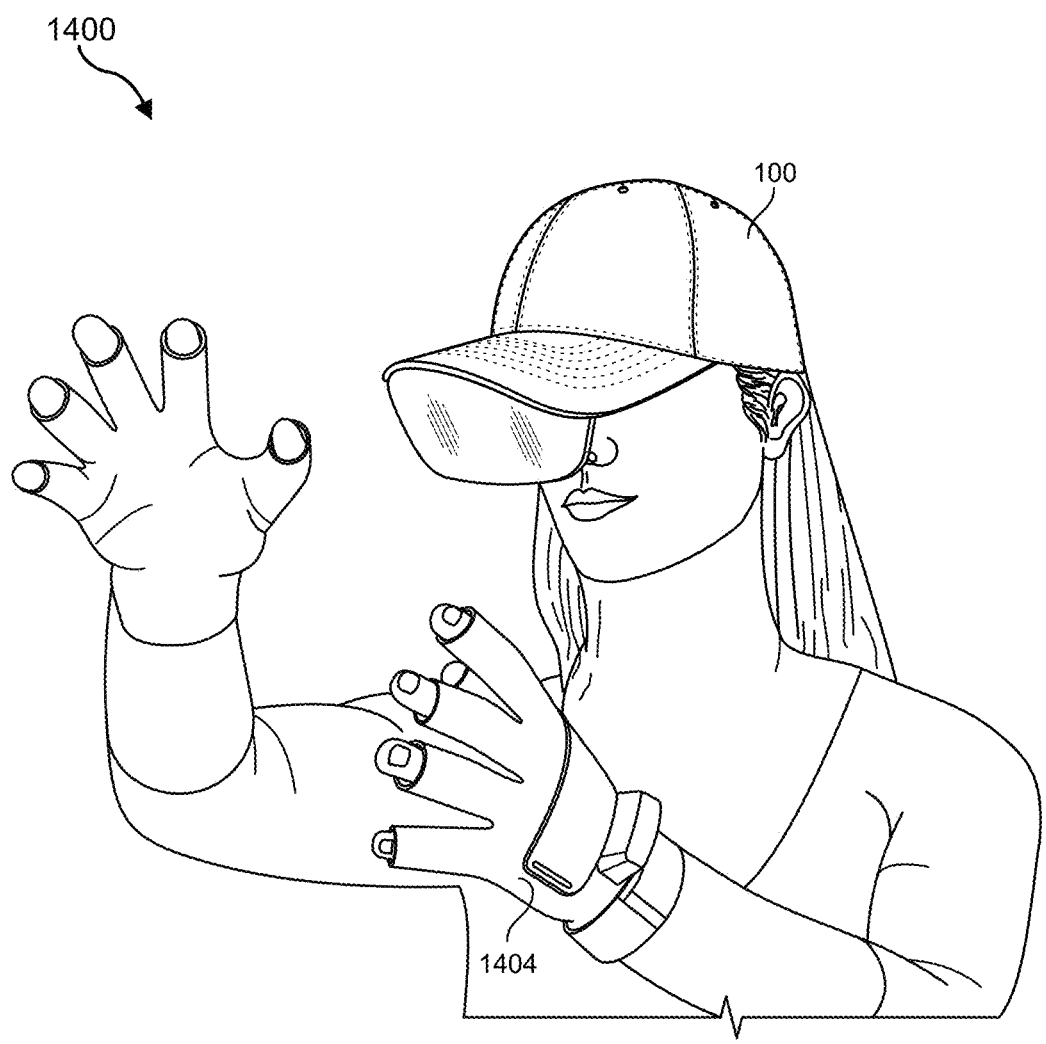
FIG. 14 is an illustration of an exemplary artificial-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including the artificial reality hat 100 from FIG. 1 and two haptic devices (i.e., gloves). In other embodiments, any number and/or combination of these components and other components may be included in an artificial-reality system. For example, in some embodiments there may be multiple artificial reality hats each having an associated haptic device, with each artificial reality hat and each haptic device communicating with the same console, portable computing device, or other computing system.

Haptic device 1404 generally represents any type or form of wearable device, worn by a user of an artificial-reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

Figure 15:
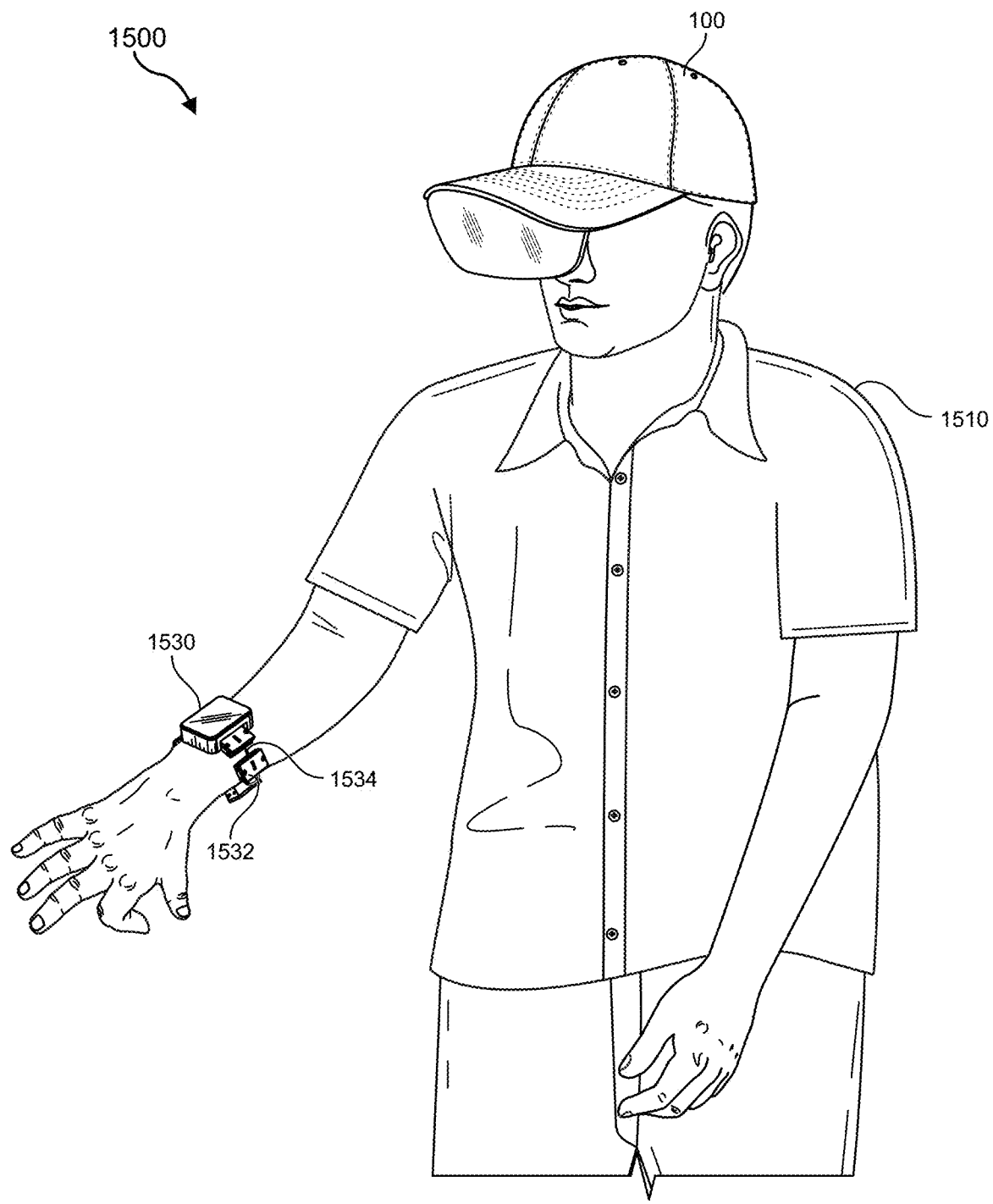
FIG. 15 is an illustration of an exemplary artificial-reality environment according to embodiments of this disclosure.

FIG. 15 is a perspective view of a user 1510 interacting with an artificial-reality system 1500. In this example, user 1510 may wear an artificial reality hat 100 that may have one or more displays and that are paired with a haptic device 1530. In this example, haptic device 1530 may be a wristband that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

Figure 16:
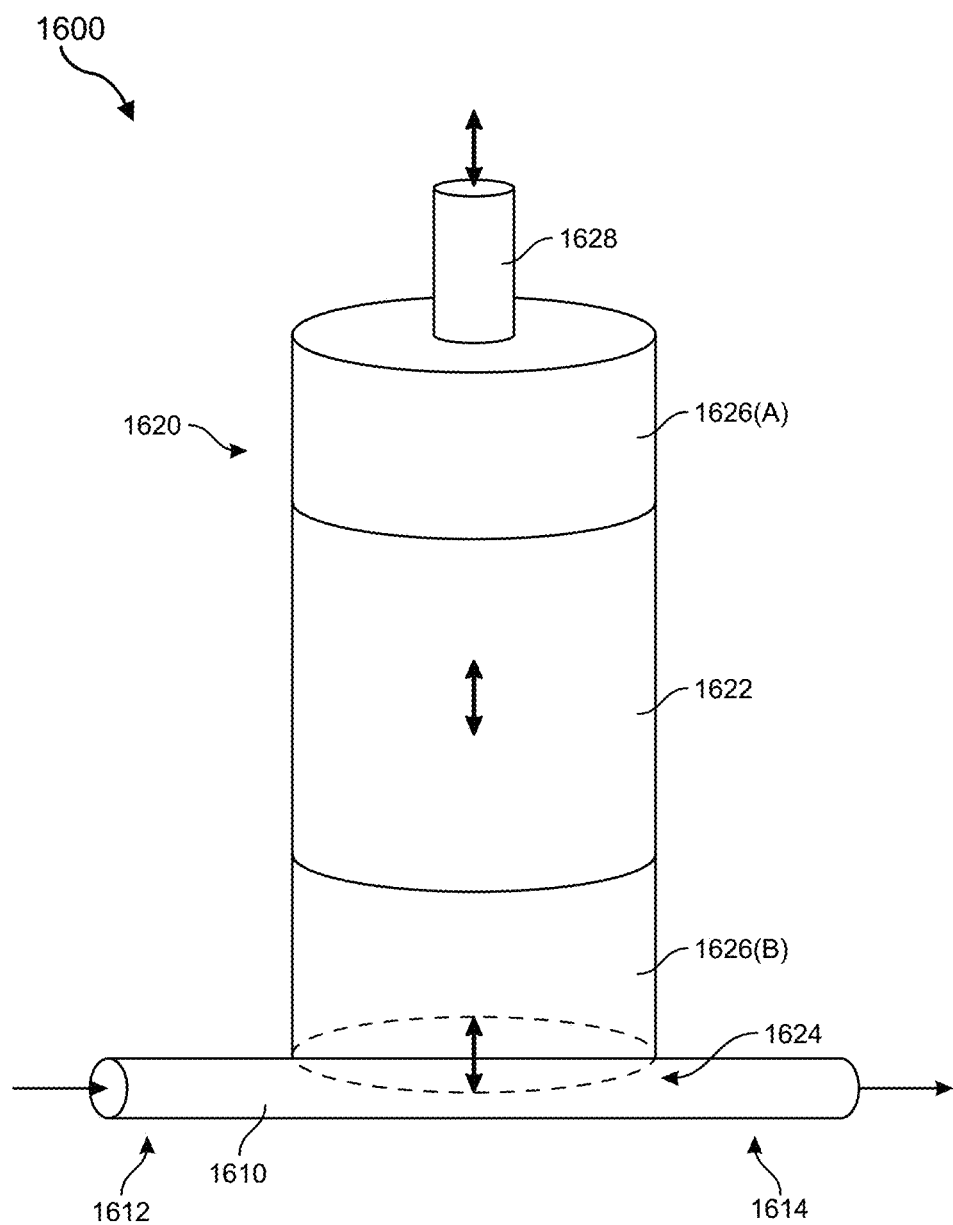
FIG. 16 is an illustration of an exemplary fluidic control system that may be used in connection with embodiments of this disclosure.

As noted above, the present disclosure may also include haptic fluidic systems that involve the control (e.g., stopping, starting, restricting, increasing, etc.) of fluid flow through a fluid channel. The control of fluid flow may be accomplished with a fluidic valve. FIG. 16 shows a schematic diagram of a fluidic valve 1600 for controlling flow through a fluid channel 1610, according to at least one embodiment of the present disclosure. Fluid from a fluid source (e.g., a pressurized fluid source, a fluid pump, etc.) may flow through the fluid channel 1610 from an inlet port 1612 to an outlet port 1614, which may be operably coupled to, for example, a fluid-driven mechanism, another fluid channel, or a fluid reservoir.

Fluidic valve 1600 may include a gate 1620 for controlling the fluid flow through fluid channel 1610. Gate 1620 may include a gate transmission element 1622, which may be a movable component that is configured to transmit an input force, pressure, or displacement to a restricting region 1624 to restrict or stop flow through the fluid channel 1610. Conversely, in some examples, application of a force, pressure, or displacement to gate transmission element 1622 may result in opening restricting region 1624 to allow or increase flow through the fluid channel 1610. The force, pressure, or displacement applied to gate transmission element 1622 may be referred to as a gate force, gate pressure, or gate displacement. Gate transmission element 1622 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 16, gate 1620 of fluidic valve 1600 may include one or more gate terminals, such as an input gate terminal 1626(A) and an output gate terminal 1626(B) (collectively referred to herein as "gate terminals 1626") on opposing sides of gate transmission element 1622. Gate terminals 1626 may be elements for applying a force (e.g., pressure) to gate transmission element 1622. By way of example, gate terminals 1626 may each be or include a fluid chamber adjacent to gate transmission element 1622. Alternatively or additionally, one or more of gate terminals 1626 may include a solid component, such as a lever, screw, or piston, that is configured to apply a force to gate transmission element 1622.

In some examples, a gate port 1628 may be in fluid communication with input gate terminal 1626(A) for applying a positive or negative fluid pressure within the input gate terminal 1626(A). A control fluid source (e.g., a pressurized fluid source, a fluid pump, etc.) may be in fluid communication with gate port 1628 to selectively pressurize and/or depressurize input gate terminal 1626(A). In additional embodiments, a force or pressure may be applied at the input gate terminal 1626(A) in other ways, such as with a piezoelectric element or an electromechanical actuator, etc.

In the embodiment illustrated in FIG. 16, pressurization of the input gate terminal 1626(A) may cause the gate transmission element 1622 to be displaced toward restricting region 1624, resulting in a corresponding pressurization of output gate terminal 1626(B). Pressurization of output gate terminal 1626(B) may, in turn, cause restricting region 1624 to partially or fully restrict to reduce or stop fluid flow through the fluid channel 1610. Depressurization of input gate terminal 1626(A) may cause gate transmission element 1622 to be displaced away from restricting region 1624, resulting in a corresponding depressurization of the output gate terminal 1626(B). Depressurization of output gate terminal 1626(B) may, in turn, cause restricting region 1624 to partially or fully expand to allow or increase fluid flow through fluid channel 1610. Thus, gate 1620 of fluidic valve 1600 may be used to control fluid flow from inlet port 1612 to outlet port 1614 of fluid channel 1610.

As detailed above, the computing devices and systems described and/or illustrated herein broadly represent any type or form of computing device or system capable of executing computer-readable instructions, such as those contained within the systems and modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), FPGAs that implement softcore processors, ASICs, portions of one or more of the same, variations or combinations of one or more of the same, or any other suitable physical processor.

Although illustrated as separate elements, the system and modules described and/or illustrated herein may represent portions of a single system, module, or application. In addition, in certain embodiments one or more of these systems or modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the systems or modules described herein may transform data, physical devices, and/or representations of physical devices from one form to another. For example, one or more of the modules or subsystems recited herein may receive data to be transformed, transform the data, output a result of the transformation to perform a function that corresponds to the modules or subsystem, use the result of the transformation to perform the specified function, and store the result of the transformation in a data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. An artificial reality hat comprising:
a processor;
a crown portion dimensioned to at least partially cover a head of a user, the crown portion including a plurality of haptic transducers arranged in a specified pattern;

a brim portion that extends from the crown portion in at least a forward direction away from the crown portion, the brim portion having an outer edge that is orthogonal to a face of the user; and a display subsystem, coupled to the brim portion, that is configured to present computer-generated images, wherein at least one tracking subsystem is positioned on the outer edge of the brim portion, providing direct line-of-sight to the user's face and to at least a portion of the user's body, wherein upon determining, by the processor, that an artificial reality feature visible using the display subsystem is available at a current location of the user, the plurality of haptic transducers provides a string of successive vibrations prompting the user to lower the display subsystem to view the available artificial reality feature.

2. The artificial reality hat of claim 1, further comprising an eye-tracking subsystem, coupled to the brim portion, that is configured to identify and track at least one characteristic of an eye of the user.

3. The artificial reality hat of claim 2, wherein the display subsystem is configured to modify, based on information generated by the eye-tracking subsystem, at least one aspect of how the computer-generated images are presented.

4. The artificial reality hat of claim 1, further comprising a face-tracking subsystem, coupled to the brim portion, that is configured to identify and track facial expressions of the user.

5. The artificial reality hat of claim 1, further comprising a body-tracking subsystem, coupled to the brim portion, that is configured to identify and track a position of at least a portion of the user's body.

6. The artificial reality hat of claim 1, further comprising a sensor subsystem configured to detect, and generate sensor data that reflects, changes in a local environment of the artificial reality hat.

7. The artificial reality hat of claim 1, further comprising an authentication subsystem configured to authenticate use of the artificial reality hat based at least in part on sensor data generated by the artificial reality hat.

8. The artificial reality hat of claim 1, further comprising a notification subsystem configured to generate user notifications, wherein the user notifications comprise at least one of:
- an audio-based notification;
- a haptics-based notification; or
- a visual-based notification.

9. The artificial reality hat of claim 1, further comprising a processing subsystem that is configured to perform computations for at least one subsystem of the artificial reality hat.

10. The artificial reality hat of claim 9, wherein at least a portion of the processing subsystem is disposed within the brim portion.

11. The artificial reality hat of claim 1, further comprising at least one brain-computer-interface sensor, positioned within the crown portion, that is configured to detect brain signals that are translatable into user input.

12. The artificial reality hat of claim 1, further comprising at least one bone conduction transducer, positioned within the crown portion, that is configured to generate bone-conduction vibrations that are translatable into sound.

13. The artificial reality hat of claim 1, further comprising at least one haptic transducer, located within the crown portion, that is configured to generate at least one haptic output.

14. The artificial reality hat of claim 1, further comprising at least one environment-facing imaging subsystem configured to image a local environment of the artificial reality hat.

15. The artificial reality hat of claim 1, wherein:
the crown portion comprises a front area and a back area;
the brim portion extends from at least the front area of the crown portion; and
the back area of the crown portion comprises at least one battery subsystem configured to provide electrical power for the artificial reality hat.

16. The artificial reality hat of claim 1, further comprising a positioning mechanism that couples the display subsystem to the brim portion and that adjustably positions the display subsystem between at least:
- a storage position in which the display subsystem is positioned in a location that is intended to be substantially outside of the user's field of view; and
- a viewing position in which the display subsystem is positioned in a location that is intended to be substantially within the user's field of view.

17. A method of manufacturing an artificial reality hat, the method comprising:
attaching a brim portion to a crown portion that is dimensioned to at least partially cover a head of a user, wherein the brim portion extends from the crown portion in at least a forward direction away from the crown portion, the crown portion including a plurality of haptic transducers arranged in a specified pattern, the brim portion having an outer edge that is orthogonal to a face of the user; and coupling a processor and a display subsystem to the brim portion, wherein the display subsystem is configured to present computer-generated images, wherein at least one tracking subsystem is positioned on the outer edge of the brim portion, providing direct line-of-sight to the user's face and to at least a portion of the user's body and wherein upon determining, by the processor, that an artificial reality feature visible using the display subsystem is available at a current location of the user, the plurality of haptic transducers provides a string of successive vibrations prompting the user to lower the display subsystem to view the available artificial reality feature.

18. The method of claim 17, further comprising coupling, to the brim portion, at least one of:
- an eye-tracking subsystem that is configured to identify and track at least one characteristic of an eye of the user;
- a face-tracking subsystem that is configured to identify and track facial expressions of the user;
- a body-tracking subsystem that is configured to identify and track the position of at least a portion of the user's body; or
- a processing subsystem that is configured to perform computations for at least one subsystem of the artificial reality hat.

19. The method of claim 17, further comprising coupling, to the crown portion, at least one of:
- at least one bone conduction transducer that is configured to generate bone-conduction vibrations that are translatable into sound;
- at least one brain-computer-interface sensor that is configured to detect brain signals that are translatable into user input;
- at least one haptic transducer that is configured to generate at least one haptic output; or at least one battery subsystem configured to provide electrical power for the artificial reality hat.

20. An artificial reality hat comprising:

a processor;

a crown portion dimensioned to at least partially cover a head of a user, the crown portion including a plurality of haptic transducers arranged in a specified pattern; and a brim portion that extends from the crown portion in at least a forward direction away from the crown portion, the brim portion having an outer edge that is orthogonal to a face of the user, wherein the brim portion comprises:

embedded electrical connections;

a coupling mechanism configured to releasably couple a removable component of an artificial reality system to the embedded electrical connections; and a display subsystem that is configured to present computer-generated images, wherein at least one tracking subsystem is positioned on the outer edge of the brim portion, providing direct line-of-sight to the user's face and to at least a portion of the user's body, wherein upon determining, by the processor, that an artificial reality feature visible using the display subsystem is available at a current location of the user, the plurality of haptic transducers provides a string of successive vibrations prompting the user to lower the display subsystem to view the available artificial reality feature.

* * * * *